United States Patent
Takizawa

(10) Patent No.: US 6,750,003 B2
(45) Date of Patent: Jun. 15, 2004

(54) METHINE DYE AND SILVER HALIDE PHOTOGRAPHIC MATERIAL CONTAINING THE SAME

(75) Inventor: Hiroo Takizawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/391,757

(22) Filed: Mar. 20, 2003

(65) Prior Publication Data

US 2003/0198906 A1 Oct. 23, 2003

(30) Foreign Application Priority Data

Mar. 22, 2002 (JP) .................................... P.2002-081018

(51) Int. Cl.$^7$ ................. G03C 1/005; G03C 1/494; G03C 1/06
(52) U.S. Cl. ................. 430/584; 430/583; 430/588; 430/591; 430/572; 430/599; 430/603
(58) Field of Search ................. 430/572, 583, 430/584, 588, 591, 599, 603

(56) References Cited

U.S. PATENT DOCUMENTS

| 5,288,738 A | 2/1994 | Vishwakarma et al. |
| 5,756,740 A | 5/1998 | Vishwakarma et al. |
| 6,586,057 B1 * | 7/2003 | Yabuki ........................ 430/20 |
| 2002/0155400 A1 * | 10/2002 | Takizawa .................... 430/574 |

FOREIGN PATENT DOCUMENTS

EP  887700  12/1998

* cited by examiner

*Primary Examiner*—Geraldine Letscher
(74) *Attorney, Agent, or Firm*—Sughrue Mion, PLLC

(57) ABSTRACT

A silver halide photographic material comprising a support and at least one photosensitive silver halide emulsion layer, wherein the emulsion layer comprises a compound represented by the following formula (1):

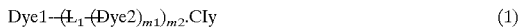

$$\text{Dye1-(L}_1\text{-(Dye2)}_{m1})_{m2}\cdot\text{CIy} \qquad (1)$$

wherein Dye1 represents a first chromophore; Dye2 represents a xanthene dye; $L_1$ represents a linking group; m1 represents an integer of from 1 to 5; m2 represents an integer of from 1 to 5; CI represents an ion for neutralizing a charge; and y represents a number necessary for neutralizing the charge.

19 Claims, No Drawings

METHINE DYE AND SILVER HALIDE PHOTOGRAPHIC MATERIAL CONTAINING THE SAME

FIELD OF THE INVENTION

The present invention relates to a novel methine dye compound, particularly a linking type methine dye compound having two chromophores linked thereto, and to a silver halide photographic material containing it.

BACKGROUND OF THE INVENTION

Methine compounds have hitherto been used as a spectral sensitizing dye of silver halide photographic materials. With respect to technologies for enhancing a light absorbance of silver halide grains, those that have been known up to the date will be given below. In order to enhance the light absorbance per grain, it is necessary to increase an adsorption density of the sensitizing dye to the silver halide grains. The usual spectral sensitizing dyes are adsorbed in a monomolecular layer substantially in closest packaging, but cannot be adsorbed any more.

In order to solve this problem, there have been found some proposals. In *Photographic Science and Engineering*, Vol. 20, No. 3, page 97 (1976), P. B. Gilman, Jr., et al. adsorbed a cationic dye in a first layer and further adsorbed an anionic dye in a second layer by an electrostatic force. In U.S. Pat. No. 3,622,316, G. B. Bird, et al. underwent multi-layer adsorption of plural dyes on silver halide grains to achieve the sensitization by the contribution of a Forster model excitation energy transfer.

In JP-A-63-138341 and JP-A-64-84244, Sugimoto, et al. underwent spectral sensitization by energy transfer from a luminescent dye.

All of these technologies are concerned with trials to adsorb the dye in an amount of the saturated adsorption amount or more onto the silver halide grains. However, there were involved problems such that an effect for achieving high sensitivity is not so revealed and that the inherent desensitization increases.

On the other hand, binary dyes in which two or more non-conjugated dye chromophores are covalently linked are disclosed in U.S. Pat. Nos. 2,393,351, 2,425,772, 2,518,732, 2,521,944 and 2,592,196 and European Patent No. 565,083. However, these patents did not intend to enhance the light absorbance. As one positively intending to enhance the light absorbance, in U.S. Pat. Nos. 3,622,317 and 3,976,493, G. B. Bird, et al. proposed to adsorb a linking type sensitizing dye molecule having plural cyanine chromophores to increase the light absorbance, thereby attempting to achieve the sensitization by energy transfer. However, a remarkable effect for achieving high sensitivity is not obtained.

In JP-A-64-91134, Ukai, et al. propose to adsorb at least one substantially non-adsorbing dye containing at least two sulfo groups or carboxy groups on a spectral sensitizing dye capable of being adsorbed on a silver halide.

Further, in JP-A-6-27578, Vishwakarma, et al. undergo spectral sensitization using a binary dye in which an adsorbing cyanine dye and a non-adsorbing oxonol dye to silver halides are linked to each other. Moreover, in European Patent No. 887700A1, Parton, et al. undergo spectral sensitization using a binary dye in which an adsorbing cyanine dye and a non-adsorbing merocyanine dye are linked to each other using a specified linking group. However, in any of these cases, it may not be said that high sensitivity is thoroughly achieved by the contribution of energy transfer.

In addition, in JP-A-6-57235, Vishwakarma, et al. disclose a process of producing a binary dye in which a cyanine dye and a merocyanine dye are linked to each other. However, there are no working examples in which high sensitivity was achieved using this binary dye as a sensitizing dye for silver halide photographic material.

As described above, in any of the methods as described in the above-cited patents and literature references, sufficiently high sensitivity was not achieved. Accordingly, it has been considered necessary to perform further technical developments.

SUMMARY OF THE INVENTION

Accordingly, an object of the invention is to provide a novel methine-linked dye and a high-sensitivity silver halide photographic material containing it.

The foregoing object of the invention has been attained by the following means.

(1) A silver halide photographic material comprising a support and at least one photosensitive silver halide emulsion layer thereon, wherein the emulsion layer contains a compound represented by the following formula (1).

Formula (1)

In the formula, Dye1 represents a first chromophore; Dye2 represents a xanthene dye; $L_1$ represents a linking group; m1 represents an integer of from 1 to 5; m2 represents an integer of from 1 to 5; CI represents an ion for neutralizing a charge; and y represents a number necessary for neutralizing the charge.

(2) The silver halide photographic material as set forth in (1) as above, wherein the xanthene dye is represented by the following formula (2).

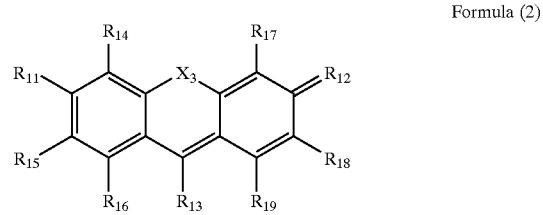

Formula (2)

In the formula, $X_3$ represents an oxygen atom or a sulfur atom; $R_{11}$ represents any one of —OM, —SM, and —$NR_2OR_{21}$; $R_{12}$ represents any one of =O, =S, and =$^+NR_{22}R_{23}$; M represents a proton or a cation; $R_{20}$ to $R_{23}$ each independently represents a hydrogen atom, an alkyl group, an alkenyl group, an aryl group, or a heterocyclic group; $R_{20}$ and $R_{21}$, or $R_{22}$ and $R_{23}$ may be linked to each other to form a ring; $R_{13}$ to $R_{19}$ each independently represents a hydrogen atom or a substituent; and in $R_{11}$ to $R_{19}$, the adjacent substituents may be linked to each other to form a ring.

(3) The silver halide photographic material as set forth in (2) as above, wherein in the formula (2), $X_3$ represents an oxygen atom.

(4) The silver halide photographic material as set forth in (2) or (3) as above, wherein in the formula (2), $R_{13}$ represents an unsubstituted or substituted aryl group.

(5) The silver halide photographic material as set forth in (4) as above, wherein in the formula (2), $R_{13}$ represents a phenyl group substituted with any one of a carboxyl group, an alkoxycarbonyl group, a carbamoyl group, a sulfo group, a halogen atom, an amino group, a hydroxyl group, an alkyl group, and an alkoxy group.

(6) The silver halide photographic material as set forth in any one of (2) to (5) as above, wherein in the formula (2), $R_1$, represents any one of —OM and —$NR_2OR_{21}$; and $R_{12}$ represents any one of =O and =$^+NR_{22}R_{23}$.

(7) The silver halide photographic material as set forth in any one of (2) to (6) as above, wherein in the formula (2), $R_{11}$ represents —OM; $R_{12}$ represents =O; and all of $R_{14}$, $R_{15}$, $R_{17}$, and $R_{18}$ represent a halogen atom.

(8) The silver halide photographic material as set forth in any one of (2) to (6) as above, wherein in the formula (2), $R_1$, represents —$NR_2OR_{21}$; $R_{12}$ represents =$^+NR_{22}R_{23}$; and $R_{14}$, $R_{15}$, $R_{17}$, and $R_{18}$ each independently represents a hydrogen atom or an alkyl group.

(9) The silver halide photographic material as set forth in any one of (1) to (8) as above, wherein in the compound represented by the formula (1), Dye1 represents any one of a cyanine chromophore, a merocyanine chromophore, and an oxonol chromophore.

(10) The silver halide photographic material as set forth in any one of (1) to (9) as above, wherein in the compound represented by the formula (1), Dye1 represents a cyanine chromophore.

(11) The silver halide photographic material as set forth in any one of (1) to (10) as above, wherein in the compound represented by the formula (1), $L_1$ represents -$G_1$-($A_1$-$G_2$)$_{t1}$-, wherein $G_1$ and $G_2$ each independently represents an alkylene group, an alkenylene group, or an arylene group; $A_1$ represents anyone of —O—, —S—, —$SO_2$—, —$NR_3$—, —COO—, —$CONR_4$—, and —$SO_2NR_5$—, regardless of the left or right direction; $R_3$ to $R_5$ each independently represents a hydrogen atom, an alkyl group, an alkenyl group, an aryl group, or a heterocyclic group; and t1 represents an integer of from 1 to 10.

(12) The silver halide photographic material as set forth in any one of (1) to (11) as above, wherein the compound represented by the formula (1) is represented by the following formula (3).

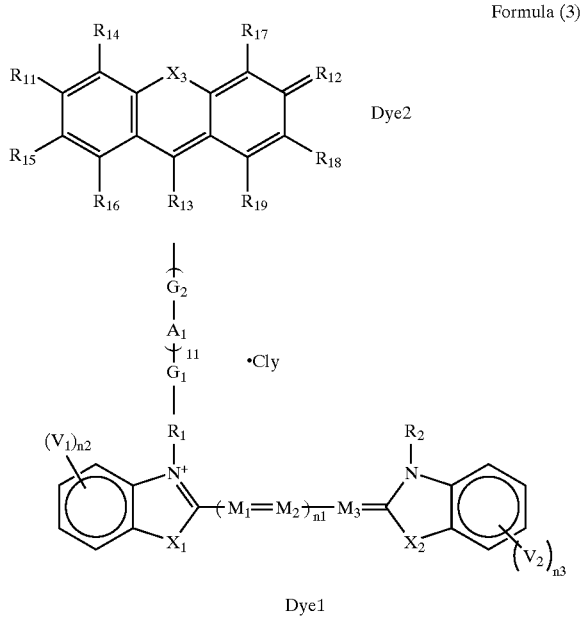

Dye2

Dye1

Formula (3)

In the formula, $X_3$ and $R_{11}$ to $R_{19}$ are synonymous with those in the formula (2); $G_1$, $G_2$, $A_1$, and t1 are synonymous with those in (11); $X_1$ and $X_2$ each independently represents —O—, —S—, —$NR_6$—, or —$CR_7R_8$—; $R_6$ to $R_8$ each independently represents a hydrogen atom, an alkyl group, an alkenyl group, an aryl group, or a heterocyclic group; $R_1$ and $R_2$ each independently represents a hydrogen atom, an alkyl group, an alkenyl group, an aryl group, or a heterocyclic group; $M_1$ to $M_3$ each independently represents a methine group; $n_1$ represents an integer of from 0 to 3; $V_1$ and $V_2$ each represents a substituent; $n_2$ and $n_3$ each represents an integer of from 0 to 4; when each of $n_2$ and $n_3$ is 2 or more, $V_1$s' and $V_2$s' may be respectively the same or different, or may be linked to each other to form a ring; CI represents an ion for neutralizing a charge; and y represents a number necessary for neutralizing the charge, provided that $G_1$ is linked to Dye1 at $R_1$ or $V_1$, and $G_2$ is linked to Dye2 at any one of $R_{11}$ to $R_{19}$.

(13) The silver halide photographic material as set forth in (11) or (12) as above, wherein in the compound represented by the formula (1) or (3), $G_1$ and $G_2$ each represents an alkylene group.

(14) The silver halide photographic material as set forth in any one of (11) to (13) as above, wherein in the compound represented by the formula (1) or (3), $A_1$ represents —O—, —$SO_2$—, —COO—, or —$CONR_4$—.

(15) The silver halide photographic material as set forth in any one of (12) to (14) as above, wherein in the compound represented by the formula (3), $X_1$ and $X_2$ each represents —O— or —S—.

(16) The silver halide photographic material as set forth in any one of (12) to (15) as above, wherein in the compound represented by the formula (3), $n_1$ is 0 or 1.

(17) The silver halide photographic material as set forth in (16) as above, wherein in the compound represented by the formula (3), $n_1$ is 1.

(18) The silver halide photographic material as set forth in (17) as above, wherein in the compound represented by the formula (3), $n_1$ is 1; and $X_1$ and $X_2$ each represents —O—.

(19) The silver halide photographic material as set forth in any one of (12) to (18) as above, wherein in the compound represented by the formula (3), $G_1$ is linked to $R_1$.

(20) The silver halide photographic material as set forth in any one of (12) to (19) as above, wherein in the compound represented by the formula (3), $G_2$ is linked to $R_{13}$.

(21) The silver halide photographic material as set forth in any one of (1) to (20) as above, wherein in the compound represented by the formula (1) or (3), an adsorptivity to silver halide grains is in the relationship of Dye1>Dye2.

(22) The silver halide photographic material as set forth in any one of (1) to (21) as above, wherein in the silver halide photographic emulsion, the compound represented by the formula (1) or (3) is adsorbed on the silver halide grains by Dye1, and Dye2 not adsorbed on the silver halide grains causes electron trnasfer or energy transfer to Dye1 upon light excitation.

(23) The silver halide photographic material as set forth in any one of (1) to (22) as above, wherein in the silver halide photographic emulsion, the compound represented by the formula (1) or (3) is adsorbed on the silver halide grains by Dye1 to form J association.

(24) The silver halide photographic material as set forth in any one of (1) to (23), wherein in the silver halide photographic emulsion, when the compound represented by the formula (1) or (3) is adsorbed on the silver halide grains by Dye1, Dye2 keeps a monomer state in an adsorbing spectral manner.

(25) The silver halide photographic material as set forth in any one of (1) to (24), wherein the silver halide photographic emulsion containing the compound represented by the formula (1) or (3) as set forth in any one of (1) to (24) as above is an emulsion in which tabular grains having an aspect ratio of 2 or more account for 50% (area) or more of the whole of the silver halide grains.

(26) The silver halide photographic material as set forth in any one of (1) to (25), wherein the silver halide photographic emulsion containing the compound represented by the formula (1) or (3) as set forth in any one of (1) to (25) as above is subjected to selenium sensitization.

(27) A dyes represented by the formula (3) as set forth in any one of (12) to (20) as above.

DETAILED DESCRIPTION OF THE INVENTION

The compound represented by the formula (1) according to the invention will be described below in detail.

Incidentally, when the compound of the invention has an alkyl group, an alkylene group, an alkenyl group, or an alkenylene group, these groups may be linear or branched and may be substituted or unsubstituted, unless otherwise indicated.

Further, when the compound of the invention has a cycloalkyl group, an aryl group, a heterocyclic group, a cycloalkenylene group, an arylene group, or a heterylene group, these groups may be monocyclic or fused and may be substituted or unsubstituted, unless otherwise indicated.

In the invention, in the case where a specified moiety is called "group", it is meant that the instant moiety may be unsubstituted itself or may be substituted with one or more (up to an allowable maximum number) substituents.

For example, the term "alkyl group" means a substituted or unsubstituted alkyl group. Further, the substituent which can be used in the compound of the invention include any substituents regardless of the presence or absence of substitution. For example, is enumerated the following group of substituents represented by W.

As the substituent represented by W, any substituents can be used without particular limitations. Examples include a halogen atom, an alkyl group [(including a cycloalkyl group, a bicycloalkyl group, and a tricycloalkyl group) and also including an alkenyl group (including a cycloalkenyl group and a bicycloalkenyl group) and an alkynyl group], an aryl group, a heterocyclic group (may be called a hetero ring group), a cyano group, a hydroxyl group, a nitro group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, an alkyl- or arylsulfonylamino group, a mercapto group, an alkylthio group, an arylthio group, a heterocyclic thio group, a sulfamoyl group, a sulfo group, an alkyl- or arylsulfinyl group, an alkyl- or arylsulfonyl group, an acyl group, an aryloxycarbonyl group, an alkoxycarbonyl group, a carbamoyl group, an aryl or heterocyclic azo group, an imido group, a phosphino group, a phosphinyl group, a phosphinyloxy group, a phosphinylamino group, a phospho group, a silyl group, a hydrazino group, a ureido group, and other known substituents.

More specifically, W represents a halogen atom (such as a fluorine atom, a chlorine atom, a bromine atom, and an iodine atom), an alkyl group [[representing a linear, branched or cyclic, substituted or unsubstituted alkyl group, inclusive of an alkyl group (preferably an alkyl group having from 1 to 30 carbon atoms, such as methyl, ethyl, n-propyl, isopropyl, t-butyl, n-octyl, eucosyl, 2-chloroethyl, 2-cyanoethyl, and 2-ethylhexyl), a cycloalkyl group (preferably a substituted or unsubstituted cycloalkyl group having from 3 to 30 carbon atoms, such as cyclohexyl, cyclopentyl, and 4-n-dodecylcyclohexyl), a bicycloalkyl group (preferably a substituted or unsubstituted bicycloalkyl group having from to 30 carbon atoms, i.e., a monovalent group in which one hydrogen atom has been eliminated from a bicycloalkane having from 5 to 30 carbon atoms, such as bicyclo[1,2,2]heptan-2-yl and bicyclo[2,2,2]octan-3-yl), and a tricyclo structure having a more ring; and the alkyl group in the following substituents (for example, an alkyl group of an alkylthio group) represents an alkyl group having such a concept and further includes an alkenyl group and an alkynyl group], an alkenyl group [representing a linear, branched or cyclic, substituted or unsubstituted alkenyl group, inclusive of an alkenyl group (preferably a substituted or unsubstituted alkenyl group having from 2 to 30 carbon atoms, such as vinyl, allyl, prenyl, gelanyl, and oleyl), a cycloalkenyl group (preferably a substituted or unsubstituted cycloalkenyl group having from 3 to 30 carbon atoms, i.e., a monovalent group in which one hydrogen atom has been eliminated from a cycloalkene having from 3 to 30 carbon atoms, such as 2-cyclopenten-1-yl and 2-cyclohexen-1-yl), and a bicycloalkenyl group (a substituted or unsubstituted bicycloalkenyl group, and preferably a substituted or unsubstituted bicycloalkenyl group having from 5 to 30 carbon atoms, i.e., a monovalent group in which one hydrogen atom has been eliminated from a bicycloalkene having one double bond, such as bicyclo-[2,2,1]hept-2-en-1-yl and bicyclo[2,2,2]oct-2-en-4-yl)], and an alkynyl group (preferably a substituted or unsubstituted alkynyl group having from 2 to 30 carbon atoms, such as ethynyl, propargyl, and trimethylsilylethynyl)], an aryl group (preferably a substituted or unsubstituted aryl group having from 6 to 30 carbon atoms, such as phenyl, p-tolyl, naphthyl, m-chlorophenyl, and o-hexadecanoylaminophenyl), a heterocyclic group (preferably a monovalent group in which one hydrogen atom has been eliminated from a 5- or 6-membered, substituted or unsubstituted aromatic or non-aromatic heterocyclic compound, and more preferably a 5- or 6-membered aromatic heterocyclic group having from 3 to 30 carbon atoms, such as 2-furyl, 2-thienyl, 2-pyrimidinyl, 2-benzothiazoyl, and cationic heterocyclic groups (e.g., 1-methyl-2-pyridinio, 1-methyl-2-quinolinio)), a cyano group, a hydroxyl group, a nitro group, a carboxyl group, an alkoxy group (preferably a substituted or unsubstituted alkoxy group having from 1 to 30 carbon atoms, such as methoxy, ethoxy, isopropoxy, t-butoxy, n-octyloxy, and 2-methoxyethoxy), an aryloxy group (preferably a substituted or unsubstituted aryloxy group having from 6 to 30 carbon atoms, such as phenoxy, 2-methylphenoxy, 4-t-butylphenoxy, and 3-nitrophenoxy, 2-tetradecanoylaminophenoxy), a silyloxy group (preferably a silyloxy group having from 3 to 20 carbon atoms, such as trimethylsilyloxy and t-butyldimethylsilyloxy), a heterocyclic oxy group (preferably a substituted or unsubstituted heterocyclic oxy group having from 2 to 30 carbon atoms, such as 1-phenyltetrazol-5-oxy and 2-tetrahydropyranyloxy), an acyloxy group (preferably a formyloxy group, a substituted or unsubstituted alkylcarbonyloxy group having from 2 to 30 carbon atoms, and a substituted or unsubstituted arylcarbonyloxy group, such as formyloxy, acetyloxy, pivaloyloxy, stearoyloxy, benzoyloxy, and p-methoxyphenylcarbonyloxy), a carbamoyloxy group (preferably a substituted or unsubstituted having from 1 to 30 carbon atoms, such as N,N-dimethylcarbamoyloxy, N,N-diethylcarbamoyloxy, morpholinocarbonyloxy, N,N-di-n- octylaminocarbonyloxy, and N-n-octylcarbamoyloxy) an alkoxycarbonyloxy group (preferably a substituted or unsubstituted alkoxycarbonyloxy group having from 2 to 30 carbon atoms, such as methoxycarbonyloxy, ethoxycarbonyloxy, t-butoxycarbonyloxy, and n-octylcarbonyloxy), an aryloxycarbonyloxy group (preferably a substituted or unsubstituted aryloxycarbonyloxy group having from 7 to 30 carbon atoms, such as phenoxycarbonyloxy, p-methoxyphenoxycarbonyloxy, and p-n-hexadecyloxyphenoxycarbonyloxy), an amino group (preferably an amino group, a substituted or unsubstituted alkyamino group having from 1 to 30 carbon atoms, and a substituted or unsubstituted anilino group having from 6 to 30 carbon atoms, such as amino, methylamino, dimethylamino, anilino, N-methyl-anilino, and dipehnylamino), an ammonio group (preferably an ammonio group and an ammonio group substituted with an alkyl, aryl or heterocyclic group having from 1 to 30 carbon atoms, such as trimethylammonio, triethylammonio, and dipehnylmethylammonio), an acylamino group (preferably a formylamino group, a substituted or unsubstituted alkylcarbonylamino group having from 1 to 30 carbon atoms, and a substituted or unsubstituted arylcarbonylamino group having from 6 to 30 carbon atoms, such as formylamino, acetylamino, pivaloylamino, lauroylamino, benzoylamino, and 3,4,5-tri-n-octyloxyphenylcarbonylamino), an aminocarbonylamino group (preferably a substituted or unsubstituted aminocarbonylamino group having from 1 to 30 carbon atoms, such as carbamoylamino, N,N-dimethylaminocarbonylamino, N,N-diethylaminocarbonylamino, and morpholinocarbonylamino), an alkoxycarbonylamino group (preferably a substituted or unsubstituted alkoxycarbonylamino group having from 2 to 30 carbon atoms, such as methoxycarbonylamino, ethoxycarbonylamino, t-butoxycarbonylamino, n-octadecyloxycarbonylamino, and N-methyl-methoxycarbonylamino), an aryloxycarbonylamino group (preferably a substituted or unsubstituted aryloxycarbonylamino group having from 7 to 30 carbon atoms, such as phenoxycarbonylamino, p-chlorophenoxycarbonylamino, and m-n-octyloxyphenoxycarbonylamino), a sulfamoylamino group (preferably a substituted or unsubstituted sulfamoylamino group having from 0 to 30 carbon atoms, such as sulfamoylamino, N,N-dimethylaminosulfonylamino and N-n-octylaminosulfonylamino), an alkyl- or arylsulfonylamino group (preferably a substituted or unsubstituted alkylsulfonylamino group having from 1 to 30 carbon atoms and a substituted or unsubstituted arylsulfonylamino group having from 6 to 30 carbon atoms, such as methylsulfonylamino, butylsulfonylamino, phenylsulfonylamino, 2,3,5-trichlorophenylsulfonylamino, and p-methylphenylsulfonylamino), a mercapto group, an alkylthio group (preferably a substituted or unsubstituted alkylthio group having from 1 to 30 carbon atoms, such as methylthio, ethylthio, and n-hexadecylthio), an arylthio group (preferably a substituted or unsubstituted arylthio group having from 6 to 30 carbon atoms, such as phenylthio, p-chlorophenylthio, and m-methoxyphenylthio), a heterocyclic thio group (preferably a substituted or unsubstituted heterocyclic thio group having from 2 to 30 carbon atoms, such as 2-benzothiazolylthio and 1-phenyltetrazol-5-ylthio), a sulfamoyl group (preferably a substituted or unsubstituted sulfamoyl group having from 0 to 30 carbon atoms, such as N-ethylsulfamoyl, N-(3-dodecyloxypropyl)sulfamoyl, N,N-dimethylsulfamoyl, N-acetylsulfamoyl, N-benzoylsulfamoyl, and N-(N-phenylcarbamoyl)sulfamoyl), a sulfo group, an alkyl- or arylsulfinyl group (preferably a substituted or unsubstituted alkylsulfinyl group having from 1 to 30 carbon atoms and a substituted or unsubstituted arylsulfinyl group having from 6 to 30 carbon atoms, such as methylsulfinyl, ethylsulfinyl, phenylsulfinyl, and p-methylphenylsulfinyl), an alkyl- or arylsulfonyl group (preferably a substituted or unsubstituted alkylsulfonyl group having from 1 to 30 carbon atoms and a substituted or unsubstituted arylsulfonyl group having from 6 to 30 carbon atoms, such as methylsulfonyl, ethylsulfonyl, phenylsulfonyl, and p-methylphenylsulfonyl), an acyl group (preferably a formyl group, a substituted or unsubstituted alkylcarbonyl group having from 2 to 30 carbon atoms, a substituted or unsubstituted arylcarbonyl group having from 7 to 30 carbon atoms, and a substituted or unsubstituted heterocyclic carbonyl group having from 4 to 30 carbon atoms, which is bound to a carbonyl group at a carbon atom, such as acetyl, pivaloyl, 2-chloroacetyl, stearoyl, benzoyl, p-n-octyloxyphenylcarbonyl, 2-pyridylcarbonyl, and 2-furylcarbonyl), an aryloxycarbonyl group (preferably a substituted or unsubstituted aryloxycarbonyl group having from 7 to 30 carbon atoms, such as phenoxycarbonyl, o-chlorophenoxycarbonyl, m-nitrophenoxycarbonyl, and p-t-butylphenoxycarbonyl), an alkoxycarbonyl group (preferably a substituted or unsubstituted alkoxycarbonyl group having from 2 to 30 carbon atoms, such as methoxycarbonyl, ethoxycarbonyl, t-butoxycarbonyl, and n-octadecyloxycarbonyl), a carbamoyl group (preferably a substituted or unsubstituted carbamoyl group having from 1 to 30 carbon atoms, such as carbamoyl, N-methylcarbamoyl, N,N-dimethylcarbamoyl, N,N-di-n-octylcarbamoyl, and N-(methylsulfonyl)carbamoyl, an aryl or heterocyclic azo group (preferably a substituted or unsubstituted aryl azo group having from 6 to 30 carbon atoms and a substituted or unsubstituted heterocyclic azo group having from 3 to 30 carbon atoms, such as phenylazo, p-chlorophenylazo, and 5-ethylthio-1,3,4-thiazol-2-ylazo), an imido group (preferably N-succinimido and N-phthalimido), a phosphino group (preferably a substituted or unsubstituted phosphino group having from 2 to 30 carbon atoms, such as dimethylphosphino, diphenylphosphino, and methylphenoxyphosphino), a phosphinyl group (preferably a substituted or unsubstituted phosphinyl group having from 2 to 30 carbon atoms, such as phosphinyl, dioctyloxyphosphinyl, and diethoxyphosphinyl), a phosphinyloxy group (preferably a substituted or unsubstituted phosphinyloxy group having from 2 to 30 carbon atoms, such as diphenoxyphosphinyloxy and dioctyloxyphosphinyloxy), a phosphinylamino group (preferably a substituted or unsubstituted phosphinylamino group having from 2 to 30 carbon atoms, such as dimethoxyphosphinylamino and dimethylaminophosphinylamino), a phospho group, a silyl group (preferably a substituted or unsubstituted silyl group having from 3 to 30 carbon atoms, such as trimethylsilyl, t-butyldimethylsilyl, and phenyldimethylsilyl), a hydrazino group (preferably a substituted or unsubstituted hydrazino group having from 0 to 30 carbon atoms, such as trimethylhydrazino), and a ureido group (preferably a substituted or unsubstituted ureido group having from 0 to 30 carbon atoms, such as N-dimethylureido).

Also, W may take a structure comprising rings fused with each other. The ring is an aromatic or non-aromatic hydrocarbon ring or a heterocyclic ring, or may form a polycyclic fused ring formed by a combination of these rings. Examples of the ring include a benzene ring, a naphthalene ring, an anthracene ring, a phenanthrene ring, a fluorene ring, a triphenylene ring, a naphthacene ring, a biphenyl ring, a pyrrole ring, a furan ring, a thiophene ring, an imidazole ring, an oxazole ring, a thiazole ring, a pyridine ring, a pyrazine ring, a pyrimidine ring, a pyridazine ring, an indolizine ring, an indole ring, a benzofuran ring, a benzothiophene ring, an isobenzofuran ring, a quinolizine ring, a quinoline ring, a phthalazine ring, a naphthyridine ring, a quinoxaline ring, a quinoxazoline ring, an isoquinoline ring, a carbazole ring, a phenanthridine ring, an acridine ring, a phenanthroline ring, a thianthrene ring, a chromene ring, a xanthene ring, a phenoxathiine ring, a phenothiazine ring, and a phenazine ring.

Among the substituents represented by W, those having a hydrogen atom or atoms may be further substituted with the foregoing substituent(s) after eliminating the hydrogen atom or atoms. Examples of such functional groups include an alkylcarbonylaminosulfonyl group, an arylcarbonylaminosulfonyl group, an alkylsulfonylaminocarbonyl group, and an arylsulfonylaminocarbonyl group. Specific examples include a methylsulfonylaminocarbonyl group, a p-methylphenylsulfonylaminocarbonyl group, an acetylaminosulfonyl group, and a benzoylaminosulfonyl group.

In the formula (1), $L_1$ represents a linking group and may be any linking group. Preferably, $L_1$ represents a linking group having from 0 to 100 carbon atoms, and preferably from 1 to 20 carbon atoms, which is constituted of one or more of an alkylene group (preferably an alkylene group having from 1 to 20 carbon atoms, such as methylene, ethylene, propylene, butylene, pentylene, hexylene, and octylene), an arylene group (preferably an arylene group having from 6 to 26 carbon atoms, such as phenylene and naphthylene), an alkenylene group (preferably an alkenylene group having from 2 to 20 carbon atoms, such as ethenylene and propenylene), an alkynylene group (preferably an alkynylene group having from 2 to 20 carbon atoms, such as ethynylene and propynylene), an amide group, an ester group, a sulfonamide group, a sulfonic acid ester group, a ureido group, a sulfonyl group, a sulfinyl group, a thioether group, an ether group, a carbonyl group, —$NR_{51}$— (wherein $R_{51}$ represents a hydrogen atom or a monovalent substituent, and as the substituent, W is preferably enumerated), and a heterylene group (preferably a heterylene group having from 1 to 26 carbon atoms, such as a 6-chloro-1,3,5-triazyl-2,4-diyl group, a pyrimidine-2,4-diyl group, and a quinoxaline-2,3-diyl group).

More preferably, $L_1$ is represented by -$G_1$-($A_1$-$G_2$-)$_{t1}$.

$A_1$ represents any one of —O—, —S—, —$SO_2$—, —$NR_3$—, —COO—, —$CONR_4$—, and —$SO_2NR_5$—, regardless of the left or right direction; $R_3$ to $R_5$ each independently represents a hydrogen atom, an alkyl group [preferably an unsubstituted alkyl group having from 1 to 18 carbon atoms, more preferably from 1 to 7 carbon atoms, and most preferably from 1 to 4 carbon atoms (such as methyl, ethyl, propyl, isopropyl, butyl, isobutyl, hexyl, octyl, 2-ethylhexyl, dodecyl, and octadecyl) and a substituted alkyl group having from 1 to 18 carbon atoms, more preferably from 1 to 7 carbon atoms, and most preferably from 1 to 4 carbon atoms {as the substituent, the alkyl group having W substituted thereon is enumerated, preferably an aralkyl group (such as benzyl and 2-phenylethyl), a hydroxyalkyl group (such as 2-hydroxyethyl, 3-hydroxypropyl, and 6-hydroxyhexyl), a carboxyalkyl group (such as 2-carboxyethyl, 3-carboxypropyl, 4-carboxybutyl, carboxymethyl, and 5-carboxypentyl), an alkoxyalkyl group (such as 2-methoxyethyl and 2-(2-methoxyethoxy)ethyl), an aryloxyalkyl group (such as 2-phenoxyethyl and 2-(1-naphthoxy) ethyl), an alkoxycarbonylalkyl group (such as ethoxycarbonylmethyl and 2-benzyloxycarbonylethyl), an aryloxycarbonylalkyl group (such as 3-phenoxycarbonylpropyl), an acyloxyalkyl group (such as 2-acetyloxyethyl), an acylalkyl group (such as 2-acetylethyl), a carbamoylalkyl group (such as 2-morpholinocarbonylethyl), a sulfamoylalkyl group (such as N,N-dimethylsulfamoylmethyl), a sulfoalkyl group (such as 2-sulfobenzyl, 3-sulfo-3-phenylpropyl, 2-sulfoethyl, 3-sulfopropyl, 3-sulfobutyl, 4-sulfobutyl, 2-[3-sulfopropoxy]ethyl, 2-hydroxy-3-sulfopropyl, and 3-sulfopropoxyethoxyethyl), a sulfatoalkyl group (such as 2-sulfatoethyl, 3-sulfatopropyl, and 4-sulfatobutyl), a hetero ring-substituted alkyl group (such as 2-(pyrrolidin-2-on-1-yl)ethyl and tetrahydrofurfuryl), an alkylsulfonylcarbamoylalkyl group (such as methanesulfonylcarbamoylmethyl), an acylcarbamoylalkyl group (such as acetylcarbamoylmethyl), an acylsulfamoylalkyl group (such as acetylsulfamoylmethyl), an alkylsulfonylsulfamoylalkyl group (such as methanesulfonylsulfamoylmethyl), and a halogen-substituted alkyl group (such as 2-chloroethyl and 2,2,2-trifluoroethyl)}], an alkenyl group (preferably an alkenyl group having from 2 to 20 carbon atoms, such as vinyl, allyl, 3-butenyl, and oleyl; and an alkenyl group having W substituted thereon, such as a sulfoalkenyl group (e.g., 3-sulfo-2-propenyl)), an aryl group (preferably a substituted or unsubstituted aryl group having from 6 to 20 carbon atoms, more preferably from 6 to 10 carbon atoms, and most preferably from 6 to 8 carbon atoms (as the substituent, W is enumerated; such as phenyl, 1-naphthyl, 2-naphthyl, p-methoxyphenyl, p-methylphenyl, and p-chlorophenyl), or a heterocyclic group (preferably a substituted or unsubstituted heterocyclic group having from 1 to 20 carbon atoms, more preferably from 3 to 10 carbon atoms, and most preferably from 4 to 8 carbon atoms (as the substituent, W is enumerated; such as 2-furyl, 2-thienyl, 2-pyridyl, 3-pyrazolyl, 3-isoxazoyl, 3-isothiazoyl, 2-imidazoyl, 2-oxazolyl, 2-thiazolyl, 2-pyridazyl, 2-pyrimidyl, 3-pyrazyl, 2-(1,3,5-triazolyl), 3-(1,24-triazolyl), 5-tetrazolyl, 5-methyl-2-thienyl, and 4-methoxy-2-pyridyl).

$R_3$ preferably represents a hydrogen atom or an alkyl group, and more preferably an alkyl group.

Preferably, $R_4$ and $R_5$ each represents a hydrogen atom or an alkyl group, and more preferably a hydrogen atom.

$A_1$ preferably represents —O—, —$SO_2$—, —COO—, or —$CONR_4$—, and more preferably —O— or —$CONR_4$—.

$G_1$ and $G_2$ each independently represents an alkylene group, an alkenylene group, or an arylene group (preferred examples are the same as in $L_1$), and may be substituted with W. Preferably, $G_1$ and $G_2$ each presents an alkylene group, and more preferably an unsubstituted linear alkylene group having from 1 to 8 carbon atoms.

t1 represents an integer of from 1 to 10, preferably an integer of from 1 to 4, and more preferably an integer of from 1 to 3. When t1 is 2 or more, plural $A_1$s' and $G_2$s' may be respectively the same or different.

When t1 is 1, $A_1$ preferably represents any one of —COO—, —$CONR_4$—, and —$SO_2NR_5$—, more preferably —COO— or —$CONR_4$—, and most preferably —$CONR_4$—.

When t1 is 2 or more, at least one of $A_1$s' preferably represents any one of —COO—, —$CONR_4$—, and —$SO_2NR_5$—, more preferably —COO— or —$CONR_4$—, and most preferably —$CONR_4$—.

Further, the rest of $A_1$s' more preferably represents any one of —COO—, —$CONR_4$—, —$SO_2NR_5$—, —O—, and —$SO_2$—, and most preferably —O— or —$CONR_4$—.

m1 represents an integer of from 1 to 5, preferably 1 or 2, and more preferably 1; and m2 represents an integer of from 1 to 5, preferably 1 or 2, and more preferably 1. Most preferably, m1 and m2 are each 1.

Dye1 represents a first chromophore. Any chromophore may be used as the chromophore represented by Dye1. Examples include cyanine dyes, styryly dyes, hemicyanine dyes, merocyanine dyes, trinuclear merocyanine dyes, tetranuclear merocyanine dyes, rhodacyanine dyes, complex cyanine dyes, complex merocyanine dyes, allopolar dyes, oxonol dyes, hemioxonol dyes, squarylium dyes, croconium dyes, azamethine dyes, coumarin dyes, arylidene dyes, anthraquinone dyes, triphenylmethane dyes, azo dyes, azomethine dyes, spiro compounds, metallocene dyes, fluorenone dyes, fulgide dyes, perylene dyes, phenazine dyes, phenothiazine dyes, quinone dyes, indigo dyes, diphenylmethane dyes, polyene dyes, acridine dyes, acridinone dyes, diphenylamine dyes, quinacridone dyes, quinophthalone dyes, phenoxazine dyes, phthaloperylene dyes, porphyrin dyes, chlorophile dyes, phthalocyanine dyes, metal complex dyes, and xanthene dyes.

Preferably, are enumerated polymethine chromophores such as cyanine dyes, styryl dyes, hemicyanine dyes, merocyanine dyes, trinuclear merocyanine dyes, tetranuclear merocyanine dyes, rhodacyanine dyes, complex cyanine dyes, complex merocyanide dyes, allopolar dyes, oxonol dyes, hemioxonol dyes, squarylium dyes, croconium dyes, azamethine dyes, and oxonol dyes.

The details of these dyes are described in, for example, F. M. Harmer, *Heterocyclic Compounds-Cyanine Dyes and Related Compounds*, John Wiley & Sons, Yew York, London (1964) and D. M. Sturmer, *Heterocyclic Compounds-Special Topics in Heterocyclic Chemistry*, Chapter 18, Section 14, pages 482 to 515. As the formulae of preferred dyes, are enumerated the formulae given at pages 32 to 36 of U.S. Pat. No. 5,994,051 and those given at pages 30 to 34 of U.S. Pat. No. 5,747,236. Further, as the formulae of preferred cyanine dyes, merocyanine dyes and rhodacyanine dyes, are enumerated the formulae (XI), (XII) and (XIII) given in columns 21 to 22 of U.S. Pat. No. 5,340,694 (however, the number of each of n12, n15, n17 and n18 is not limited, but is an integer of 0 or more (preferably 4 or less)).

Preferably, Dye1 represents any one of a cyanine chromophore, a merocyanine chromophore, and an oxonol chromophore, more preferably any one of a cyanine chromophore and a merocyanine chromophore, and most preferably a cyanine chromophore.

The cyanine chromophore is preferably a chromophore represented by the following formula (4).

In the formula, $Za_1$ and $Za_2$ each represents an atomic group forming a 5-membered or 6-membered nitrogen-containing heterocyclic ring, which may be further fused with a benzene ring, a benzofuran ring, a pyridine ring, a pyrrole ring, an indole ring, or a thiophene ring.

$Ra_1$ and $Ra_2$ each represents a hydrogen atom, an alkyl group, an alkenyl group, an aryl group, or a heterocyclic group (preferred examples are the same as in $R_3$ to $R_5$), preferably a hydrogen atom, an alkyl group, or a sulfoalkyl group, and more preferably an alkyl group or a sulfoalkyl group.

$Ma_1$ to $Ma_7$ each represents a methine group, which may have a substituent. As the substituent, any of those enumerated above for W can be used. Preferably, examples of the substituent include an alkyl group having from 1 to 20 carbon atoms (such as methyl, ethyl, and isopropyl), a halogen atom (such as chlorine, bromine, iodine, and fluorine), a nitro group, an alkoxy group having from 1 to 20 carbon atoms (such as methoxy and ethoxy), an aryl group having from 6 to 26 carbon atoms (such as phenyl and 2-naphthyl), a heterocyclic group having from 0 to 20 carbon atoms (such as 2-pyridyl and 3-pyridyl), an aryloxy group having from 6 to 20 carbon atoms (such as phenoxy, 1-naphthoxy, and 2-naphthoxy), an acylamino group having from 1 to 20 carbon atoms (such as acetylamino and benzoylamino), a carbamoyl group having from 1 to 20 carbon atoms (such as N,N-dimethylcarbamoyl), a sulfo group, a hydroxyl group, a carboxy group, an alkylthio group having from 1 to 20 carbon atoms (such as methylthio), and a cyano group. The methine group may be taken together with other methine group to form a ring, or may be taken together with an auxochrome to form a ring. Preferably, the methine group is an unsubstituted, ethyl group-substituted, or methyl group-substituted methine group.

$na^1$ and $na^2$ are each 0 or 1, and preferably 0. $ka^1$ represents an integer of from 0 to 3, preferably an integer of from 0 to 2, and more preferably 0 or 1. When $ka^1$ is 2 or more, $Ma_3s'$ and $Ma_4s'$ may be respectively the same or different.

CI represents an ion for neutralizing a charge; and y represents a number necessary for neutralizing the charge.

The merocyanine chromophore is preferably a chromophore represented by the following formula (5).

Formula (4)

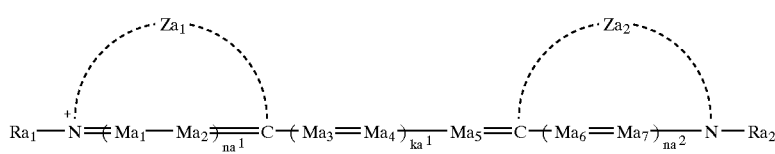

Formula (5)

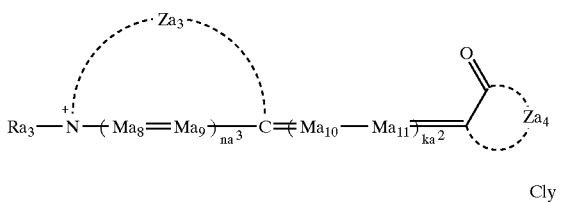

In the formula, $Za_3$ represents an atomic group forming a 5-membered or 6-membered nitrogen-containing heterocyclic ring, which may be further fused with a benzene ring, a benzofuran ring, a pyridine ring, a pyrrole ring, an indole ring, or a thiophene ring. $Za_4$ represents an atomic group forming an acid nucleus. $Ra_3$ represents a hydrogen atom, an alkyl group, an alkenyl group, an aryl group, or a heterocyclic group (preferred examples are the same as in $Ra_1$ and $Ra_2$). $Ma_8$ to $Ma_{11}$ each represents a methine group (preferred examples are the same as in $Ma_1$ to $Ma_7$). $na^3$ is 0 or 1. $ka^2$ represents an integer of from 0 to 3, preferably an integer of from 0 to 2, and more preferably 1 or 2.

When $ka^2$ is 2 or more, $Ma_{10}s'$ and $Ma_{11}s'$ maybe respectively the same or different.

CI represents an ion for neutralizing a charge; and y represents a number necessary for neutralizing the charge.

The oxonol chromophore is preferably a chromophore represented by the following formula (6).

Formula (6)

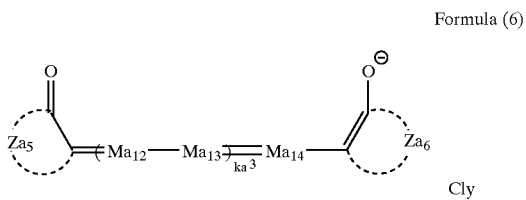

In the formula, $Za_5$ and $Za_6$ each represents an atomic group forming an acid nucleus. $Ma_{12}$ to $Ma_{14}$ each represents a methine group (preferred examples are the same as in $Ma_1$ to $Ma_7$). $ka^3$ represents an integer of from 0 to 3, and preferably an integer of from 0 to 2. When $ka^3$ is 2 or more, $Ma_{12}s'$ and $Ma_{13}s'$ may be respectively the same or different.

CI represents an ion for neutralizing a charge; and represents a number necessary for neutralizing the charge.

Examples of $Za_1$, $Za_2$ and $Za_3$ include an oxazole nucleus having from 3 to 25 carbon atoms (such as 2-3-methyloxazolyl, 2-3-ethyloxazolyl, 2-3,4-diethyloxazolyl, 2-3-methylbenzoxazolyl, 2-3-ethylbenzoxazolyl, 2-3-sulfoethylbenzoxazolyl, 2-3-sulfopropylbenzoxazolyl, 2-3-methylthioethylbenzoxazolyl, 2-3-methoxyethyl-benzoxazolyl, 2-3-sulfobutylbenzoxazolyl, 2-3-methyl-β-naphthoxazolyl, 2-3-methyl-α-naphthoxazolyl, 2-3-sulfopropyl-o-naphthoxazolyl, 2-3-sulfopropyl-γ-naphthoxazolyl, 2-3-(3-naphthoxyethyl)benzoxazolyl, 2-3,5-dimethylbenzoxazolyl, 2-6-chloro-3-methylbenzoxazolyl, 2-5-bromo-3-methylbenzoxazolyl, 2-3-ethyl-5-methoxybenzoxazolyl, 2-5-phenyl-3-sulfopropyl-benzoxazolyl, 2-5-(4-bromophenyl)-3-sulfobutyl-benzoxazolyl, and 2-3-dimethyl-5,6-dimethylthiobenzoxazolyl), a thiazole nucleus having from 3 to 25 carbon atoms (such as 2-3-methylthiazolyl, 2-3-ethylthiazolyl, 2-3-sulfopropylthiazolyl, 2-3-sulfobutylthiazolyl, 2-3,4-dimethylthiazolyl, 2-3,4,4-trimethylthiazolyl, 2-3-carboxyethylthiazolyl, 2-3-methylbenzothiazolyl, 2-3-ethylbenzothiazolyl, 2-3-butylbenzothiazolyl, 2-3-sulfopropylbenzothiazolyl, 2-3-sulfobutylbenzothiazolyl, 2-3-methyl-β-naphthothiazolyl, 2-3-sulfopropyl-γ-naphthothiazolyl, 2-3-(1-naphthoxyethyl)benzothiazolyl, 2-3,5-dimethylbenzothiazolyl, 2-6-chloro-3-methylbenzothiazolyl, 2-6-iodo-3-ethylbenzothiazolyl, 2-5-bromo-3-methylbenzothiazolyl, 2-3-ethyl-5-methoxybenzothiazolyl, 2-5-phenyl-3-sulfopropylbenzothiazolyl, 2-5-(4-bromophenyl)-3-sulfobutylbenzothiazolyl, and 2-3-dimethyl-5,6-dimethylthiobenzothiazolyl), an imidazole nucleus having from 3 to 25 carbon atoms (such as 2-1,3-diethylimidazoyl, 2-1,3-dimethylimidazoyl, 2-1-methylbenzoimidazoyl, 2-1,3,4-triethylimidazoyl, 2-1,3-diethylbenzoimidazoyl, 2-1,3,5-trimethylbenzoimidazoyl, 2-6-chloro-1,13-dimethylbenzoimidazoyl, 2-5,6-dichloro-1,3-diethylbenzoimidazoyl, and 2-1,3-disulfopropyl-5-cyano-6-chlorobenzoimidazoyl), an indolenine nucleus having from 10 to 30 carbon atoms (such as 3,3-dimethylindolenine), a quinoline nucleus having from 9 to carbon atoms (such as 2-1-methylquinolyl, 2-1-methylquinolyl, 2-1-ethyl-6-chloroquinolyl, 2-1,3-diethylquinolyl, 2-1-methyl-6-methylthioquinolyl, 2-1-sulfopropylquinolyl, 4-1-methylquinolyl, 4-1-sulfoethylquinolyl, 4-1-methyl-7-chloroquinolyl, 4-1,8-diethylquinolyl, 4-1-methyl-6-methylthioquinolyl, and 4-1-sulfopropylquinolyl), a selenazole nucleus having from 3 to 25 carbon atoms (such as 2-3-methylbenzoselenazolyl), and a pyridine nucleus having from 5 to 25 carbon atoms (such as 2-pyridyl). In addition, there are enumerated a thiazoline nucleus, an oxazoline nucleus, a selenazoline nucleus, a tellurazoline nucleus, a tellurazole nucleus, a benzotellurazole nucleus, an imidazoline nucleus, an imidazo[4,5-quinoxaline] nucleus, an oxadiazole nucleus, a thiadiazole nucleus, a tetrazole nucleus, and pyrimidine nucleus.

These nuclei may have a substituent. As the substituent, those enumerated above for W are enumerated. Preferred examples of the substituent include an alkyl group (such as methyl, ethyl, and propyl), a halogen atom (such as chlorine, bromine, iodine, and fluorine), a nitro group, an alkoxy group (such as methoxy and ethoxy), an aryl group (such as phenyl) a heterocyclic group (such as 2-pyridyl, 3-pyridyl, 1-pyrrolyl, and 2-thienyl), an aryloxy group (such as phenoxy), an acylamino group (such as acetylamino and benzoylamino), a carbamoyl group (such as N,N-dimethylcarbamoyl), a sulfo group, a sulfonamide group (such as methanesulfonamide), a sulfamoyl group (such as N-methylsulfamoyl), a hydroxyl group, a carboxy group, an alkylthio group (such as methylthio), and a cyano group.

Among them, are more preferable an oxazole nucleus, an imidazole nucleus, and a thiazole nucleus. These heterocyclic rings may further be fused. Examples of the ring to be fused include a benzene ring, a benzofuran ring, a pyridine ring, a pyrrole ring, an indole ring, and a thiophene ring.

$Za_4$, $Za_5$ and $Za_6$ each represents an atomic group forming an acid nucleus, which is defined according to James, ed., The Theory of the Photographic Process, 4th Edition, Macmillan, 1977, page 198. Specific examples include nuclei such as 2-pyrazolon-5-one, pyrazolidine-3,5-dione, imidazolin-5-one, hydantoin, 2- or 4-thiohydantoin, 2-iminooxazolidin-4-one, 2-oxazolin-5-one, 2-thioxazoline-2,4-dione, isorhodanine, rhodanine, indane-1,3-dione, thiophen-3-one, thiophen-3-one-1,1-dioxide, indolin-2-one, indolin-3-one, 2-oxoindazolium, 5,7-dioxo-6,7-dihydrothiazolo[3,2-a]-pyrimidine, 3,4-dihydroisoquinolin- 4-one, 1,3-dioxane-4,6-dione, barbituric acid, 2-thiobarbituric acid, courmarin-2,4-dione, indazolin-2-one, pyrido-[1,2-a]pyrimidine-1,3-dione, pyrazolo[1,5-b]quinazolone, and pyrazolopyridone.

Among them are preferable hydantoin, rhodanine, barbituric acid, and 2-oxazolin-5-one. $Za_4$ is preferably barbituric acid.

As specific examples of the cyanine chromophore, merocyanine chromophore and oxonol chromophore, are enumerate those described in F. M. Harmer, *Heterocyclic Compounds-Cyanine Dyes and Related Compounds*, John Wiley & Sons, Yew York, London (1964).

As the formulae of the cyanine dyes and merocyanine dyes, are enumerated the formulae (XI), and (XII) given at pages 21 to 22 of U.S. Pat. No. 5,340,694 (however, the number of each of n12 and n15 is not limited, but is an integer of 0 or more (preferably an integer of from 0 to 4)).

Dye2 represents a xanthene dye. The xanthene dye is preferably represented by the formula (2).

In the formula, $X_3$ represents an oxygen atom or a sulfur atom, and preferably an oxygen atom.

$R_{11}$ represents any one of —OM, —SM, and —$NR_2OR_{21}$; $R_{12}$ represents any one of =O, =S, and =$^+NR_{22}R_{23}$; M represents a proton or a cation (preferred examples are the same as in the cation for CI as described later); and $R_{20}$ to $R_{23}$ each independently represents a hydrogen atom, an alkyl group, an alkenyl group, an aryl group, or a heterocyclic group (preferred examples are the same as in $R_3$ to $R_5$), and preferably a hydrogen atom, an alkyl group, or an aryl group.

$R_{20}$ and $R_{21}$, or $R_{22}$ and $R_{23}$ may be linked to each other to form a ring. Preferred examples of the ring to be formed include a piperidine ring, a pyrrolidine ring, a morpholine ring, and a piperazine ring.

Preferably, $R_{20}$ and $R_{22}$ each represents an alkyl group or an aryl group, more preferably an alkyl group, and most preferably an ethyl group.

Preferably, $R_{21}$ and $R_{23}$ each represents a hydrogen atom or an alkyl group, and more preferably a hydrogen atom or an ethyl group.

Preferably, $R_{11}$ represents —OM or —$NR_2OR_{21}$, and $R_{12}$ represents =O or =$^+NR_{22}R_{23}$. It is preferred that when $R_1$ represents —OM, $R_{12}$ represents =O and that when $R_1$, represents —$NR_2OR_{21}$, $R_{12}$ represents =$^+NR_{22}R_{23}$.

$R_{13}$ to $R_{19}$ each independently represents a hydrogen atom or a substituent. As the substituent, any of those enumerated above for W may be used. Preferred examples include an alkyl group having from 1 to 20 carbon atoms (preferred examples are the same as in $R_3$ to $R_5$), an aryl group having from 6 to 20 carbon atoms (such as phenyl and 2-naphthyl), a heterocyclic group having from 0 to 20 carbon atoms (such as 2-pyridyl, 3-pyridyl, 1-pyrrolyl, and 2-thienyl), a halogen atom (such as chlorine, bromine, iodine, and fluorine), an alkoxy group having from 1 to 20 carbon atoms (such as methoxy and ethoxy), an aryloxy group having from 6 to 20 carbon atoms (such as phenoxy, 1-naphthoxy, and 2-naphthoxy), an alkylthio group having from 1 to 20 carbon atoms (such as methylthio), an amino group having from 0 to 20 carbon atoms (such as an amino group, an N-ethylamino group, an N,N-diethylamino group, and an anilino group), an acylamino group having from 1 to 20 carbon atoms (such as acetylamino and benzoylamino), a carbamoyl group having from 1 to 20 carbon atoms (such as N,N-dimethylcarbamoyl), an alkoxycarbonyl group having from 2 to 20 carbon atoms (such as ethoxycarbonyl), a sulfonamide group having from 0 to 20 carbon atoms (such as methanesulfonamide), a sulfamoyl group having from 0 to 20 carbon atoms (such as N-methylsulfamoyl), a nitro group, a sulfo group, a hydroxyl group, a carboxyl group, and a cyano group.

Preferably, $R_{14}$, $R_{15}$, $R_{17}$, and $R_{18}$ each represents a hydrogen atom, an alkyl group, a halogen atom, an alkoxy group, a sulfo group, a hydroxyl group, or a cyano group, and more preferably a hydrogen atom, an alkyl group, a halogen atom, or a sulfo group.

Preferably, $R_{16}$ and $R_{19}$ each represents a hydrogen atom.

$R_{13}$ preferably represents an unsubstituted or substituted aryl group, more preferably a phenyl group substituted with any one of a carboxyl group, an alkoxycarbonyl group, a carbamoyl group, a sulfo group, a halogen atom, an amino group, a hydroxyl group, an alkyl group, and an alkoxy group, and most preferably a phenyl group substituted with at least one of a carboxyl group, an alkoxycarbonyl group, and a carbamoyl group.

In $R_{11}$, to $R_{19}$, the adjacent substituents may be linked to each other to form a ring. Preferred examples of the ring to be formed include a benzene ring, a naphthalene ring, a cyclohexane ring, a cyclopentane ring, a pyridine ring, a pyrazine ring, a piperidine ring, a pyrrolidine ring, an oxazole ring, a thiazole ring, an imidazole ring, and a dioxane ring.

When $R_{11}$, represents —OM, and $R_{12}$ represents =O, it is more preferable that all of $R_{14}$, $R_{15}$, $R_{17}$, and $R_{18}$ represent a halogen atom.

When $R_{11}$ represents —$NR_2OR_{21}$, and $R_{12}$ represents =$^+NR_{22}R_{23}$, it is more preferable that $R_{14}$, $R_{15}$, $R_{17}$, and $R_{18}$ each independently represents a hydrogen atom or an alkyl group.

More preferably, the compound represented by the formula (1) according to the invention is represented by the formula (3).

In the formula, $X_3$ and $R_{11}$ to $R_{19}$ are synonymous with those in (2) as above, and $G_1$, $G_2$, $A_1$, and t1 are synonymous with those in (11) as above.

$X_1$ and $X_2$ each independently represents —O—, —S—, —$NR_6$—, or —$CR_7R_8$—; and $R_6$ to $R_8$ each independently represents a hydrogen atom, an alkyl group, an alkenyl group, an aryl group, or a heterocyclic ring (preferred examples are the same as in $R_3$ to $R_5$). $R_6$ preferably represents a hydrogen atom, an alkyl group, or a sulfoalkyl group, and more preferably an alkyl group or a sulfoalkyl group. Preferably, $R_7$ and $R_8$ each represents an alkyl group.

Preferably, $X_1$ and $X_2$ each represents —O— or —S—, and more preferably —O—.

$R_1$ and $R_2$ each independently represents a hydrogen atom, an alkyl group, an alkenyl group, an aryl group, or a heterocyclic ring (preferred examples are the same as in $R_3$ to $R_5$), and preferably a hydrogen atom, an alkyl group, or an acid-substituted alkyl group (examples of the acid group include a carboxy group, a sulfo group, a phosphato group, a sulfonamide group, a sulfamoyl group, and an acylsulfonamide group). As the acid-substituted alkyl group is preferable a sulfoalkyl group.

More preferably, $R_1$ and $R_2$ each represents an alkyl group or a sulfoalkyl group.

$M_1$ to $M_3$ each independently represents a methine group (preferred examples are the same as in $Ma_1$ to $Ma_{14}$), and preferably an unsubstituted, ethyl group-substituted or methyl group-substituted methine group.

$n_1$ represents an integer of from 0 to 3, preferably an integer of from 0 to 2, and more preferably 0 or 1. When $n_1$ is 2 or more, $M_1s'$ and $M_2s'$ may be respectively the same or different.

When $n_1$ is 0, it is preferred that both of $X_1$ and $X_2$ represent —S—. When $n_1$ is 1, preferably, both of $X_1$ and $X_2$ represent —O—, or either one of $X_1$ or $X_2$ represents —O—, and the other represents —S—, and more preferably, both of $X_1$ and $X_2$ represent —O—.

$V_1$ and $V_2$ each represents a substituent, and any of those enumerated above for W may be used any of those enumerated above for W may be used. Preferred examples of the substituent include an alkyl group having from 1 to 20 carbon atoms (preferred examples are the same as in $R_3$ to $R_5$), an aryl group having from 6 to 20 carbon atoms (such as phenyl and 2-naphthyl), a heterocyclic group having from 0 to 20 carbon atoms (such as 2-pyridyl, 3-pyridyl, 1-pyrrolyl, and 2-thienyl), a halogen atom (such as chlorine, bromine, iodine, and fluorine), an alkoxy group having from 1 to 20 carbon atoms (such as methoxy and ethoxy), an aryloxy group having from 6 to 20 carbon atoms (such as phenoxy, 1-naphthoxy, and 2-naphthoxy), an alkylthio group having from 1 to 20 carbon atoms (such as methylthio), an acylamino group having from 1 to 20 carbon atoms (such as acetylamino and benzoylamino), a carbamoyl group having from 1 to 20 carbon atoms (such as N,N-dimethylcarbamoyl), a sulfonamide group having from 0 to 20 carbon atoms (such as methanesulfonamide), a sulfamoyl group having from 0 to 20 carbon atoms (such as N-methylsulfamoyl), a nitro group, a sulfo group, a hydroxyl group, a carboxyl group, and a cyano group. Preferably, $V_1$ and $V_2$ each represents an alkyl group, a halogen atom (particularly chlorine and bromine), an aryl group, an acylamino group, a carbamoyl group, or an alkoxy group. A preferred substitution position is the 5- or 6-position.

$n_2$ and $n_3$ each represents an integer of from 0 to 4, and preferably an integer of from 0 to 2. When each of $n_2$ and $n_3$ is 2 or more, $V_1s'$ and $V_2s'$ may be respectively the same or different, or may be respectively taken together to form a ring. Preferred examples of the ring to be formed include a benzene ring, a pyridine ring, a benzofuran ring, a thiophene ring, a pyrrole ring, and an indole ring, with a benzene ring being more preferred.

CI represents an ion for neutralizing a charge. Whether a certain compound is a cation or an anion, or it has a net ionic charge, relies on its substituent. A typical cation is an ammonium ion or an alkali metal ion, whereas an anion may be any of an inorganic ion and an organic ion.

Examples of the cation include a sodium ion, a potassium ion, a triethylammonium ion, a diethyl (isopropyl) ammonium ion, a pyridinium ion, and a 1-ethylpyridinium ion; and examples of the anion include a halogen anion (such as a chlorine ion, a bromine ion, a fluorine ion, and an iodine ion), a substituted arylsulfonic acid ion (such as p-toluenesulfonic acid ion), an alkyl sulfate ion (such as a methyl sulfate ion), a sulfuric acid ion, a perchloric acid ion, a tetrafluoroboric acid ion, and an acetic acid ion. y represents the number necessary for neutralizing the charge.

$G_1$ is linked to Dye1 at $R_1$ or $V_1$, and $G_2$ is linked to Dye2 at any one of $R_{11}$ to $R_{19}$. Here, groups, in which one hydrogen atom has been eliminated from the terminal of each of $G_1$, $G_2$, $R_1$, $V_1$, and $R_{11}$, to $R_{19}$, are linked to each other. However, this does not always mean that the compound be produced by such a synthesis method.

Preferred examples of $V_1$ to be linked to $G_1$ include a carboxy group, an alkoxy group, an acylamino group, a carbamoyl group, a sulfonamide group, a sulfamoyl group, a hydroxyl group, and an alkylthio group, with an acylamio group and a carbamoyl group being more preferred. Preferably, $G_1$ is linked to $R_1$.

Preferably, $G_2$ is linked to $R_{13}$. At this time, $R_{13}$ preferably represents a phenyl group substituted with a carboxyl group or a carbamoyl group. It is preferred that $R_{13}$ is linked to $G_2$ via this carboxyl group or carbamoyl group.

In the compound represented by the formula (1) or (3) according to the invention, preferred examples of Dye1 will be given below, but it should not be construed that the invention is limited thereto. Incidentally, the structural formula of each of the compounds of the invention as described below is merely one limiting structure of resonance structures which the compound of the invention can take, and the compound may take other structure which it can take by resonance.

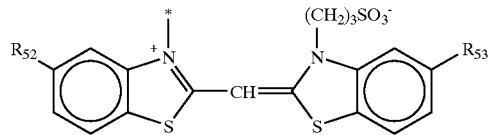

|       | $R_{52}$ | $R_{53}$ |
|-------|----------|----------|
| DA-1  | —Ph      | —Cl      |
| DA-2  | —Cl      | —Cl      |
| DA-3  | —Ph      | —Ph      |
| DA-4  | —Cl      | —H       |
| DA-5  | —N⟨pyrrolyl⟩ | —Cl  |

-continued
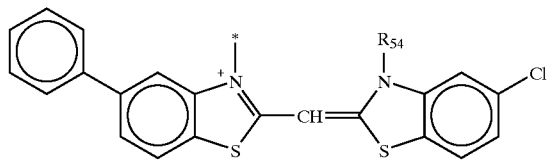
R_{54}
| | |
|---|---|
| DA-6 | $-(CH_2)_4-SO_3^-$ |
| DA-7 | $-(CH_2)_2-CH(CH_3)SO_3^-$ |
| DA-8 | $-C_2H_5$ |
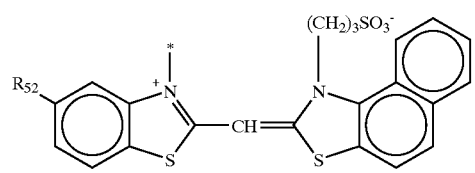
R_{52}
| | |
|---|---|
| DA-9 | $-Cl$ |
| DA-10 | $-OCH_3$ |
| DA-11 | $-Ph$ |
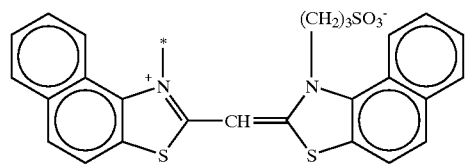
DA-12
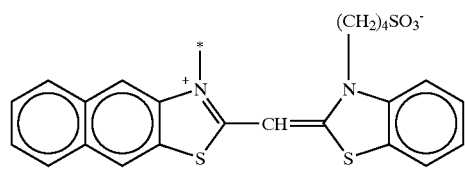
DA-13
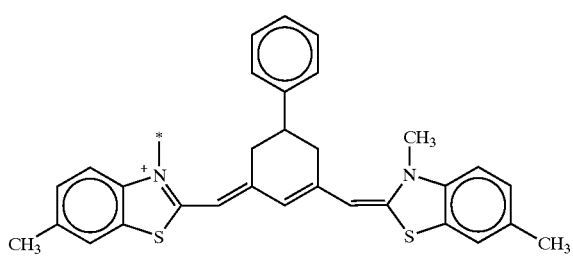
DA-14

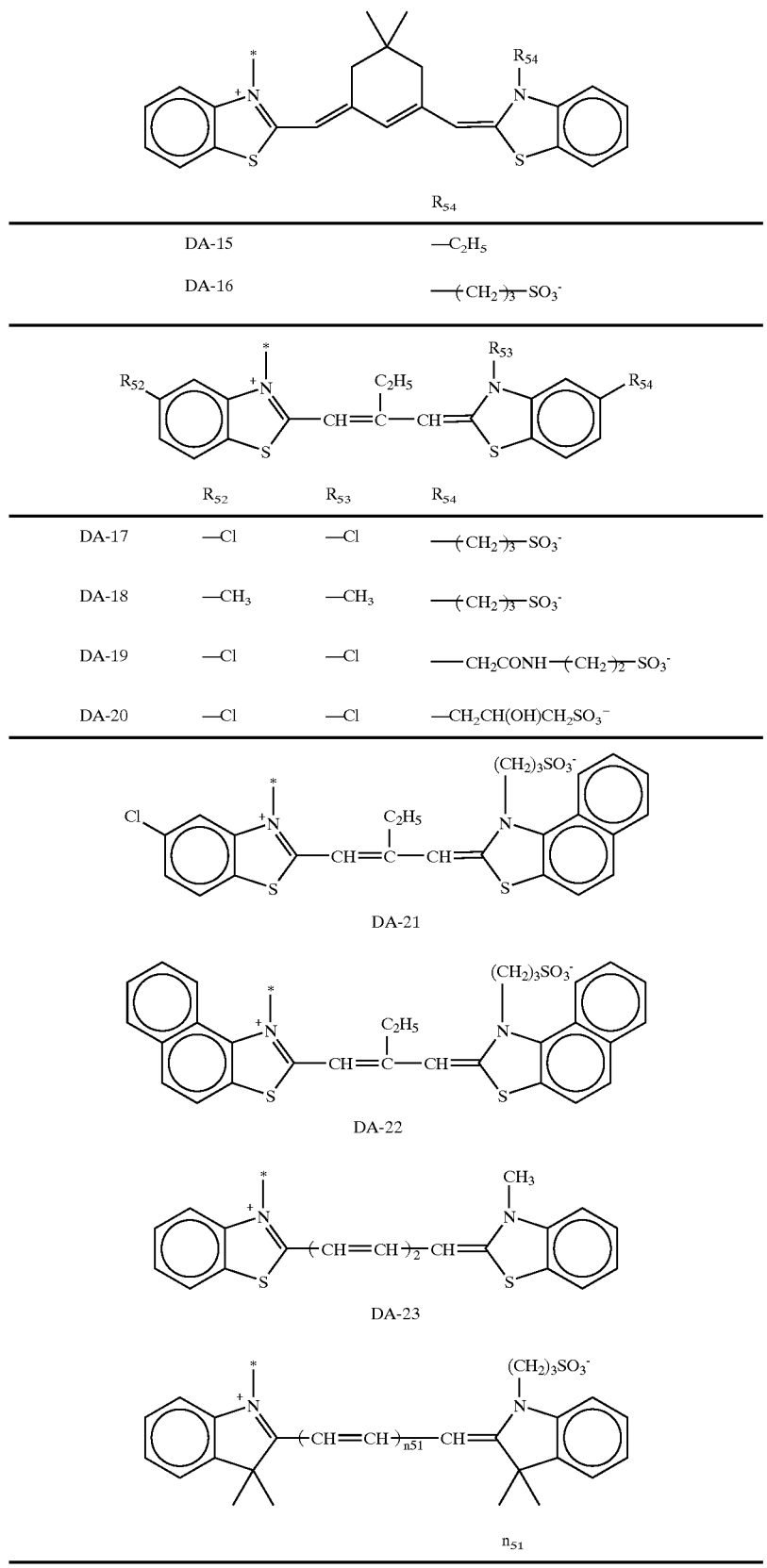

-continued

| | |
|---|---|
| DA-24 | 1 |
| DA-25 | 2 |

[Structure: bis-benzimidazole cyanine dye with Cl substituents, N-C₂H₅ and N-(CH₂)₃SO₃⁻ groups, connected by −(CH=CH)$_{n_{52}}$−CH= bridge]

$n_{52}$

| | |
|---|---|
| DA-26 | 0 |
| DA-27 | 1 |
| DA-28 | 2 |

[Structure DA-29: bis(benzofuro-thiazole) monomethine dye with N-* and N-(CH₂)₃SO₃⁻ substituents]

DA-29

[Structure DA-30: 5-phenylbenzoxazole–5-chlorobenzoxazole monomethine dye with N-* and N-(CH₂)₃SO₃⁻]

DA-30

[Structure DA-31: 5-chlorobenzothiazole–5-phenylbenzoxazole monomethine dye with N-* and N-(CH₂)₃SO₃⁻]

DA-31

[Structure DA-32: 5-chlorobenzoxazole–naphthothiazole monomethine dye with N-* and N-(CH₂)₃SO₃⁻]

DA-32

[Structure DA-33: 5,6-dichloro-1-ethylbenzimidazole–5-phenylbenzoxazole monomethine dye with N-* and N-(CH₂)₃SO₃⁻]

DA-33

-continued
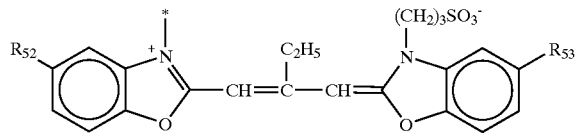
| | $R_{52}$ | $R_{53}$ |
|---|---|---|
| DA-34 | —Br | —Br |
| DA-35 | —Ph | —Cl |
| DA-36 | —Cl | —Cl |
| DA-37 | —Ph | —Ph |
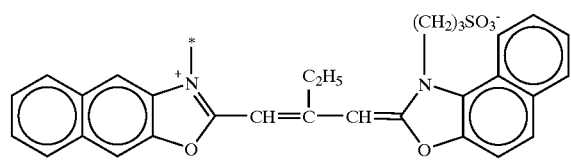
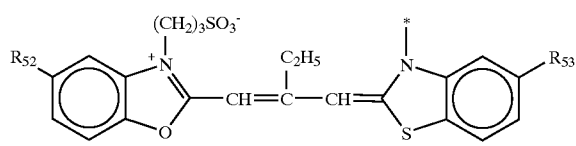
| | $R_{52}$ | $R_{53}$ |
|---|---|---|
| DA-39 | —Cl | —Cl |
| DA-40 | —Ph | —H |
| DA-41 | —OCH$_3$ | —CH$_3$ |
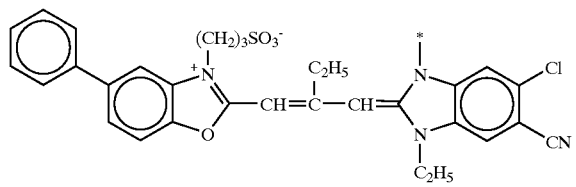
DA-42
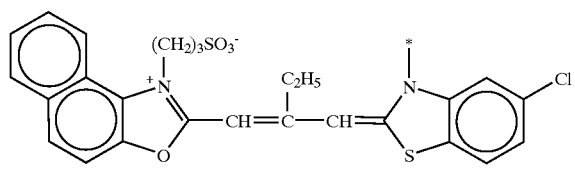
DA-43
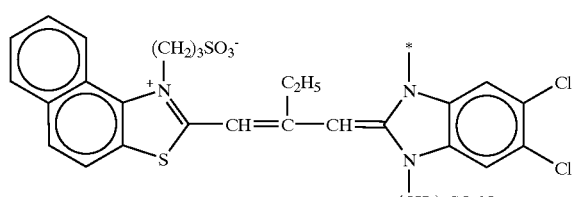
DA-44

-continued
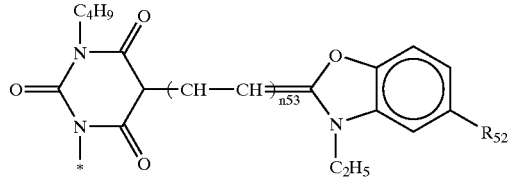
|        | n_{53} | R_{52}   |
|--------|--------|----------|
| DA-45  | 1      | H        |
| DA-46  | 1      | —SO$_3$Na |
| DA-47  | 2      | H        |
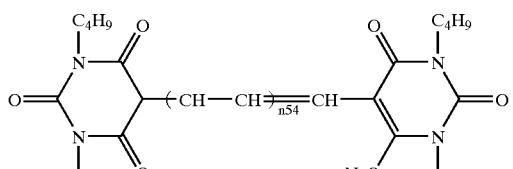
|        | n_{54} |
|--------|--------|
| DA-48  | 0      |
| DA-49  | 1      |
| DA-50  | 2      |
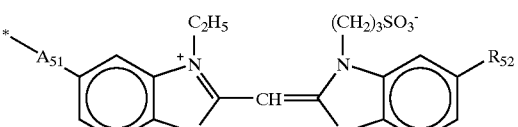
|        | A_{51}     | R_{52} |
|--------|------------|--------|
| DA-51  | —O—        | —Ph    |
| DA-52  | —OC(=O)—   | "      |
| DA-53  | —NHCO—     | "      |
| DA-54  | —NHSO$_2$— | "      |
| DA-55  | —CONH—     | "      |
| DA-56  | —SO$_2$NH— | "      |
| DA-57  | —NHCO—     | —Cl    |
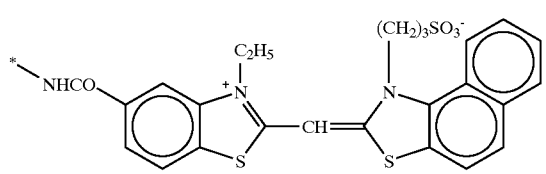
DA-58
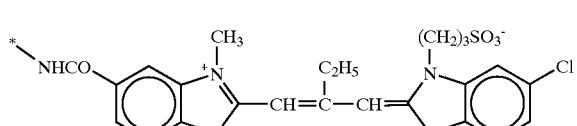

-continued
DA-59
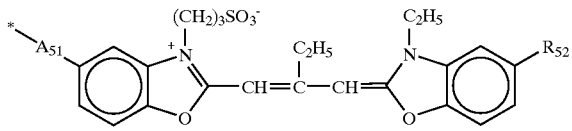
| | $A_{51}$ | $R_{52}$ |
|---|---|---|
| DA-60 | —NHCO— | —Br |
| DA-61 | —CONH— | —Cl |
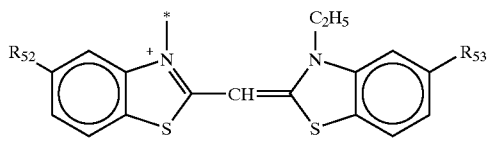
| | $R_{52}$ | $R_{53}$ |
|---|---|---|
| DA-62 | —Ph | —Cl |
| DA-63 | —Cl | —Cl |
| DA-64 | —Ph | —Ph |
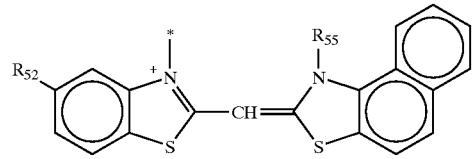
| | $R_{52}$ | $R_{55}$ |
|---|---|---|
| DA-65 | —Cl | —CH$_3$ |
| DA-66 | —Cl | —C$_2$H$_5$ |
| DA-67 | —OCH$_3$ | —C$_2$H$_5$ |
| DA-68 | —Ph | —C$_2$H$_5$ |
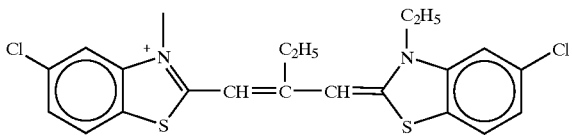
DA-69
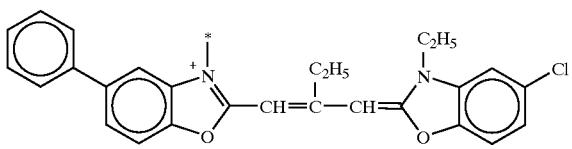
DA-70
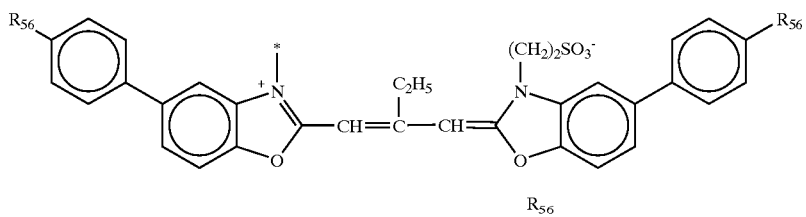
| | $R_{56}$ |
|---|---|
| DA-71 | —H |
| DA-72 | —Br |
In the compound represented by the formula (1) or (2) according to the invention, preferred examples of the xanthene dye, Dye2 will be given below, but it should not be construed that the invention is limited thereto.

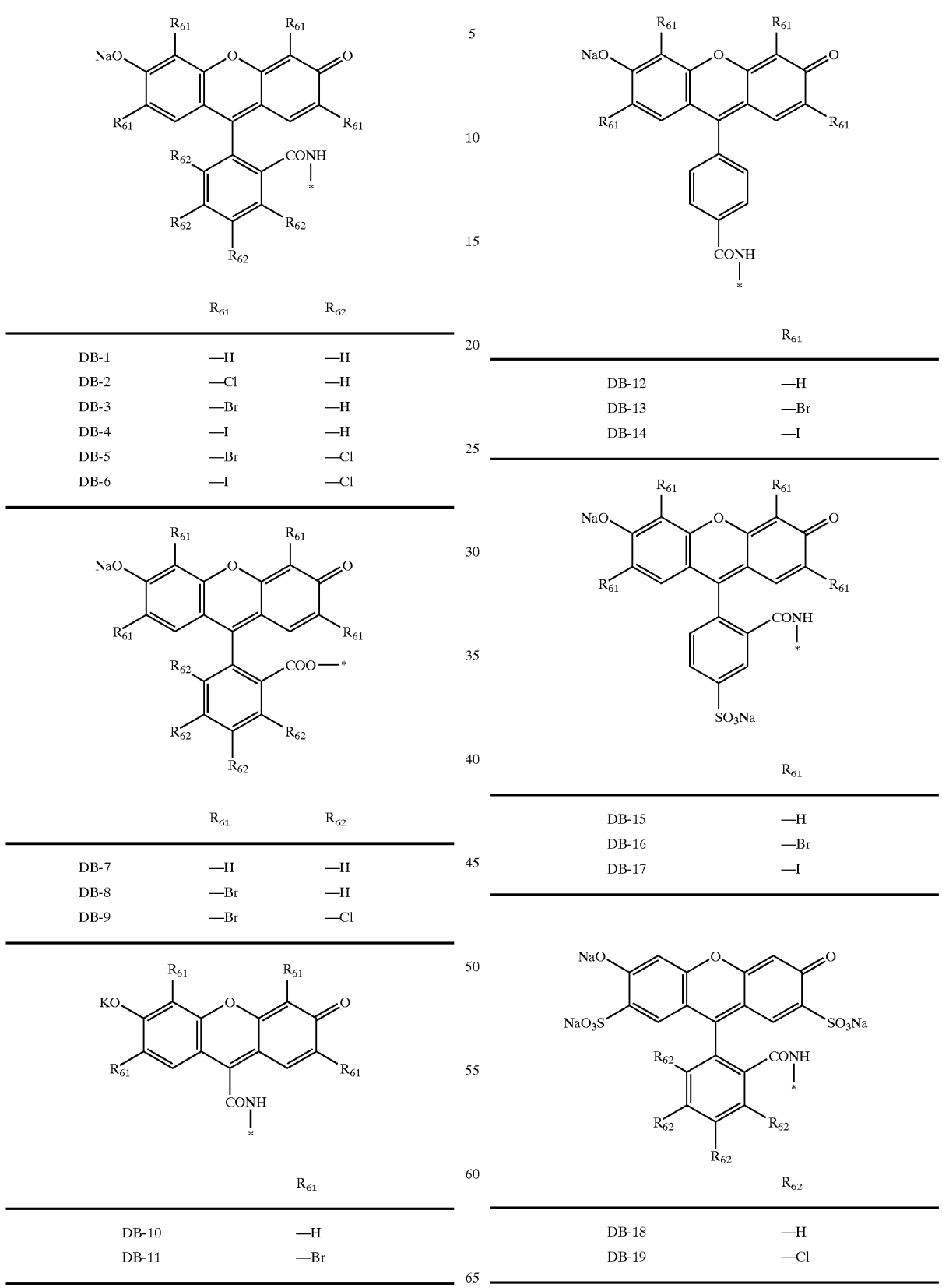

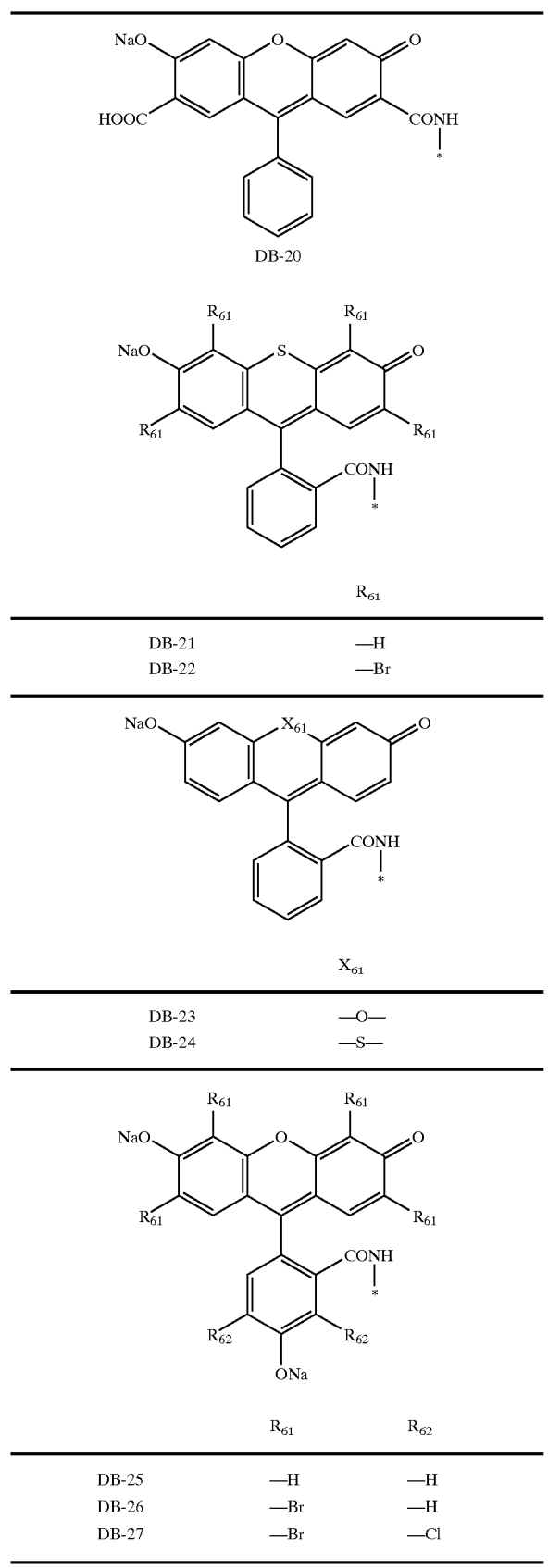
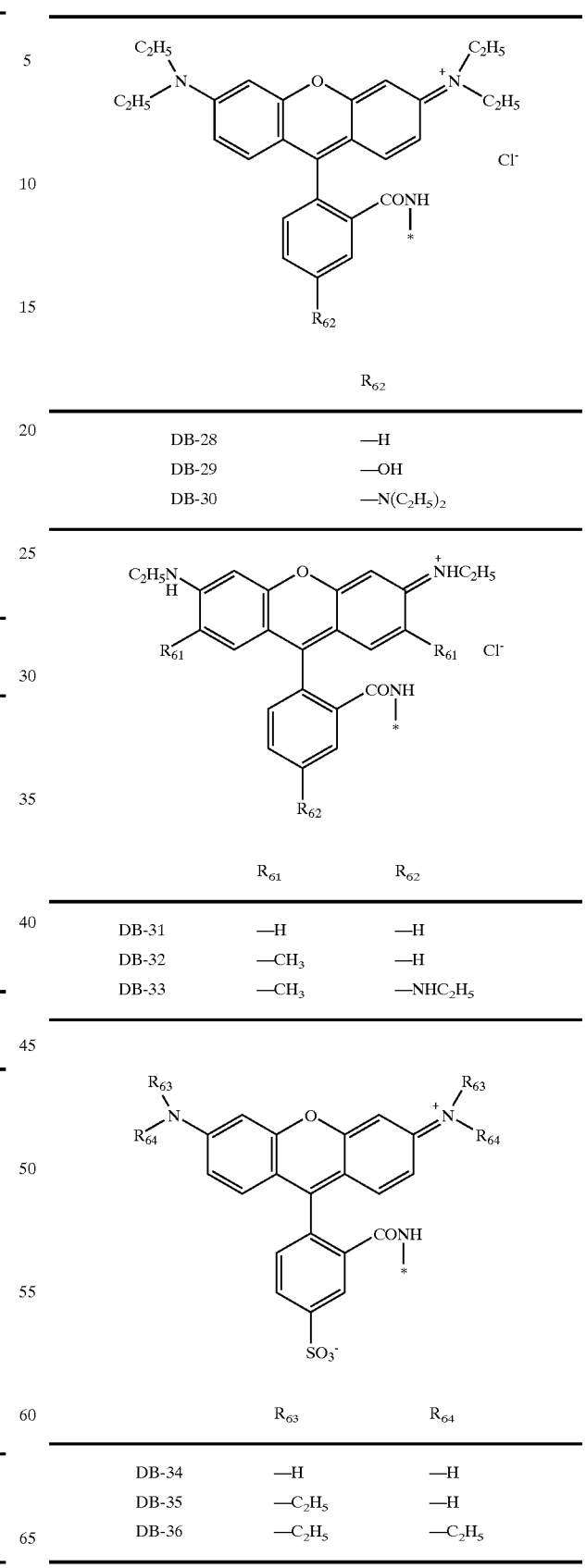

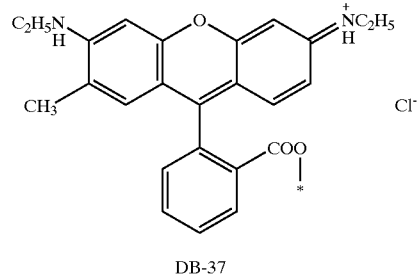

DB-37

In the compound represented by the formula (1) or (3) according to the invention, preferred examples of the linking group, -$L_1$— will be given below, but it should not be construed that the invention is limited thereto.

Examples of the linking group, -$L_1$- (the left side means Dye1):

—$(CH_2)_4$—
L-1

—$(CH_2)_8$—
L-2

—$(CH_2)_7$—CH=CH—$(CH_2)_7$—
L-3

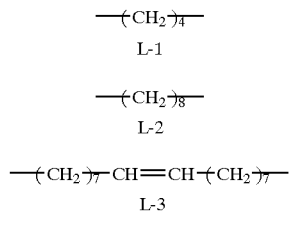
L-4

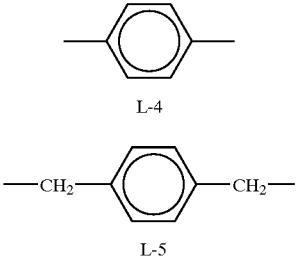
L-5

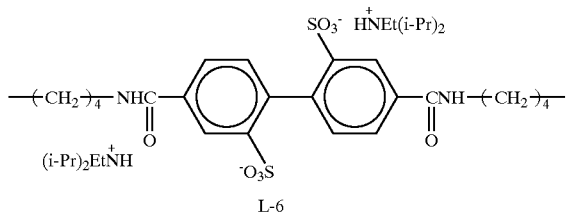
L-6

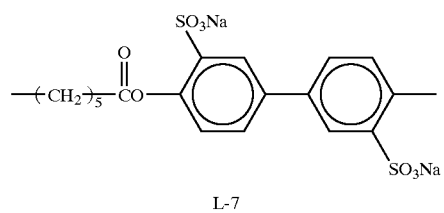
L-7

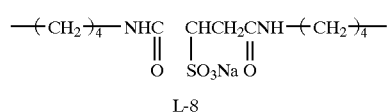
L-8

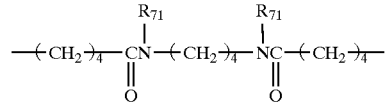

| L-9 | —$(CH_2)_3$—$SO_3Na$ |
| L-10 | —$(CH_2)_2$—$COONa$ |
| L-11 | —$(CH_2)_2$—$PO_3Na_2$ |

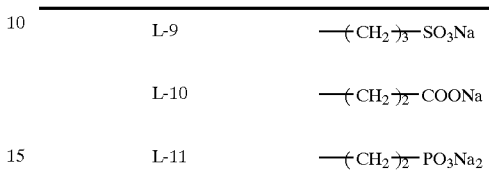
L-12

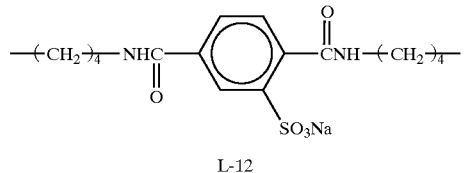
L-13

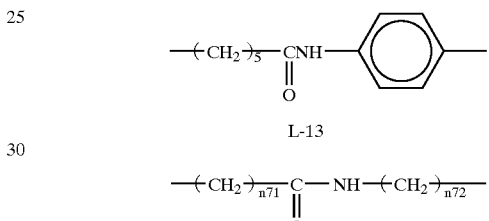

|      | $n_{71}$ | $n_{72}$ |
| ---- | -------- | -------- |
| L-14 | 5        | 8        |
| L-15 | 5        | 4        |
| L-16 | 5        | 3        |
| L-17 | 5        | 2        |
| L-18 | 3        | 4        |
| L-19 | 1        | 4        |

—$(CH_2)_4$—NH—C—$(CH_2)_5$—
            ‖
            O
L-20

—$(CH_2)_5$—CNH—$(CH_2)_2$—NHC—$(CH_2)_4$—
         ‖              ‖
         O              O
L-21

—$(CH_2)_{n73}$—CO—$(CH_2)_{n74}$—
              ‖
              O

|      | $n_{73}$ | $n_{74}$ |
| ---- | -------- | -------- |
| L-22 | 5        | 2        |
| L-23 | 5        | 6        |

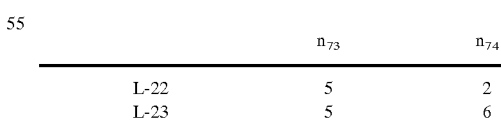
L-24

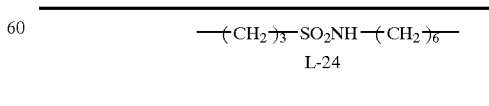

-continued

|      | $n_{76}$ |
|------|----|
| L-25 | 2  |
| L-26 | 4  |

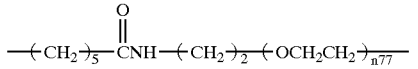

|      | $n_{77}$ |
|------|----|
| L-27 | 1  |
| L-28 | 2  |

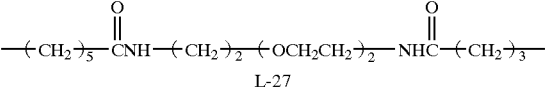

L-27

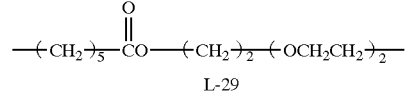

L-29

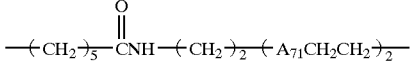

|      | $A_{71}$ |
|------|----|
| L-30 | —S— |
| L-31 | —N(CH$_3$)— |
| L-32 | —CH(OH)— |
| L-33 | —SO$_2$— |

—(CH$_2$)$_2$—(OCH$_2$CH$_2$)$_{n77}$—

|      | $n_{77}$ |
|------|----|
| L-34 | 2  |
| L-35 | 3  |

Specific examples of the compound represented by the formula (1) or (3) according to the invention will be given below, but it should not be construed that the invention is limited thereto.

Examples of the compound, Dye1-L-Dye2 according to the invention:

|      | Dye1  | -L-   | Dye2  |
|------|-------|-------|-------|
| D-1  | DA-11 | L-35  | DB-1  |
| D-2  | DA-17 | L-36  | DB-30 |
| D-3  | DA-71 | L-17  | DB-3  |
| D-4  | DA-72 | L-16  | DB-4  |
| D-5  | DA-71 | L-17  | DB-5  |
| D-6  | DA-40 | L-35  | DB-6  |
| D-7  | DA-37 | L-30  | DB-8  |
| D-8  | DA-35 | L-13  | DB-11 |
| D-9  | DA-71 | L-15  | DB-13 |
| D-10 | DA-71 | L-17  | DB-16 |
| D-11 | DA-72 | L-28  | DB-19 |
| D-12 | DA-34 | L-16  | DB-20 |

-continued

|      | Dye1  | -L-   | Dye2  |
|------|-------|-------|-------|
| D-13 | DA-27 | L-35  | DB-21 |
| D-14 | DA-44 | L-36  | DB-26 |
| D-15 | DA-71 | L-17  | DB-28 |
| D-16 | DA-40 | L-35  | DB-28 |
| D-17 | DA-71 | L-17  | DB-32 |
| D-18 | DA-37 | L-17  | DB-36 |
| D-19 | DA-71 | L-17  | DB-17 |
| D-20 | DA-71 | L-17  | DB-35 |

For example, the compound of the invention can be synthesized according to the methods described in F. M. Harmer, *Heterocyclic Compounds-Cyanine Dyes and Related Compounds*, John Wiley & Sons, Yew York, London (1964); D. M. Sturmer, *Heterocyclic Compounds-Special Topics in Heterocyclic Chemistry*, Chapter 18, Section 14, pages 482 to 515, John Wiley & Sons, Yew York, London (1977); and European Patent No. 87700A1.

In the compound represented by the formula (1) or (3), an adsorptivity to silver halide grains is in the relationship of Dye1>Dye2. Incidentally, the adsorptivity to silver halide grains can be determined by using the respective model compound.

When Dye2 of the compound represented by the formula (1) or (3) is light excited, it is preferred that Dye2 can cause electron tansfer or energy transfer to Dye1.

Further, it is preferred that in silver halide photographic emulsions and silver halide photographic materials, the compound represented by the formula (1) or (3) is adsorbed on the silver halide grains by Dye1, and Dye2 not adsorbed on the silver halide grains causes electron transfer or energy transfer to Dye1 upon light excitation.

Moreover, it is preferred that in silver halide photographic emulsions and silver halide photographic materials, the compound represented by the formula (1) or (3) is adsorbed on the silver halide grains by Dye1 to form J association.

In addition, it is preferred that in silver halide photographic emulsions, when the compound represented by the formula (1) or (3) is adsorbed on the silver halide grains by Dye1, Dye2 keeps a monomer state in an adsorbing spectral manner.

Next, the silver halide photographic material of the invention will be described below in detail.

The compound of the invention is used mainly as a sensitizing dye in silver halide emulsions and silver halide photographic materials.

The compound of the invention can be used singly or in admixture of two or more thereof, or can be used in combination with other sensitizing dye for the silver halide emulsion or silver halide photographic material. Preferred examples of the dye to be used include cyanine dyes, merocyanine dyes, rhodacyanine dyes, trinuclear merocyanine dyes, tetranuclear merocyanine dyes, allopolar dyes, hemicyanine dyes, and styryly dyes. Among them are more preferable cyanine dues, merocyanine dyes, and rhodacyanine dyes, with cyanine dyes being most preferred. The details of these dyes are described in, for example, F. M. Harmer, *Heterocyclic Compounds-Cyanine Dyes and Related Compounds*, John Wiley & Sons, Yew York, London (1964); D. M. Sturmer, *Heterocyclic Compounds-Special Topics in Heterocyclic Chemistry*, Chapter 18, Section 14, pages 482 to 515, John Wiley & Sons, Yew York, London (1977); and *Rodd's Chemistry of Carbon Compounds*, 2nd. Ed., Vol. IV, Part B (1977), Chapter 15, pages 369 to 422, Elsevier Science Publishing Company Inc., New York.

As the preferred dye are enumerated sensitizing dyes represented by the formulae and enumerated as specific examples at pages 32 to 44 of U.S. Pat. No. 5,994,051 and at pages 30 to 39 pages of U.S. Pat. No. 5,747,236.

Further, as the formulae of preferred cyanine dyes, merocyanine dyes and rhodacyanine dyes, are enumerated the formulae (XI), (XII) and (XIII) given in columns 21 to 22 of U.S. Pat. No. 5,340,694 (however, the number of each of n12, n15, n17 and n18 is not limited, but is an integer of 0 or more (preferably 4 or less)).

These sensitizing dyes may be used singly or in admixture of two or more thereof. A combination of the sensitizing dyes is often employed especially for the purpose of supersensitization. Representative examples are described in U.S. Pat. Nos. 2,688,545, 2,977,229, 3,397,060, 3,522,052, 3,527,641, 3,617,293, 3,628,964, 3,666,480, 3,672,898, 3,679,428, 3,003,377, 3,769,301, 3,814,609, 3,837,862 and 4,026,707, British Patent Nos. 1,344,281 and 1,507,803, JP-B-43-49336, JP-B-53-12375, JP-A-52-110618, and JP-A-52-109925.

The emulsion may contain a dye that does not have a spectral sensitizing action itself, or a substance that does not substantially absorb a visible light but exhibits supersensitization, together with the sensitizing dye.

A supersensitizer useful for the spectral sensitization in the invention (such as pyrimidylamino compounds, triazinylamino compounds, azolium compounds, aminostyryl compounds, aromatic organic acid-formaldehyde condensates, azaindene compounds, and cadmium compounds) and a combination of the supersensitizer with the sensitizing dye are described in, for example, U.S. Pat. Nos. 3,511,646, 3,615,613, 3,615,632, 3,615,641, 4,596,767, 4,945,038, 4,965,182, 4,965,182, 2,933,390, 3,635,721, 3,743,510, 3,617,295, and 3,635,721. With respect to the method of use thereof, the methods as described in these patents are preferred.

The timing of adding the sensitizing dye of the invention (similarly other sensitizing dye and supersensitizer) to the silver halide emulsion of the invention may be any stages of the preparation of the emulsion, which have been admitted to be useful up to date. For example, the sensitizing dye may be added at any timing or during any step before application of the emulsion, such as during the step of formation of silver halide grains or/and at the timing before desalting, or during the step of desalting and/or at the timing after desalting but before the start of chemical ripening, as disclosed in U.S. Pat. Nos. 2,735,766, 3,628,960, 4,183,756 and 4,225,666, JP-A-58-184142, and JP-A-60-196949; and at the timing just before chemical ripening or during chemical ripening, or at the timing after chemical ripening until the application, as disclosed in JP-A-58-113920. Further, as disclosed in U.S. Pat. No. 4,225,666 and JP-A-58-7629, the same compound may be added singly or in combination of a compound of a different kind of structure, for example, dividedly during the step of grain formation and during the step of chemical ripening or after completion of chemical ripening, or before or during the step of chemical ripening and after completion of chemical ripening. Moreover, the sensitizing dye may be added by changing the kind of the compound or combination of the compounds to be dividedly added.

The addition amount of the sensitizing dye of the invention (similarly other sensitizing dye and supersensitizer) varies depending on the shape and size of the silver halide grains, and any addition amount may be employed. Preferably, the sensitizing dye can be added in an amount of from $1 \times 10^{-8}$ to $8 \times 10^{-1}$ moles per mole of the silver halide.

For example, in the case where the grain size of the silver halide is from 0.2 to 1.3 μm, the addition amount of the sensitizing dye is preferably from $2 \times 10^{-6}$ to $3.5 \times 10^{-3}$ moles, and more preferably from $7.5 \times 10^{-6}$ to $1.5 \times 10^{-3}$ moles per mole of the silver halide.

The sensitizing dye of the invention (similarly other sensitizing dye and supersensitizer) can be dispersed directly in the emulsion. Also, the sensitizing dye can be first dissolved in a proper solvent (such as methyl alcohol, ethyl alcohol, methyl cellosolve, acetone, water, pyridine, and mixed solvents thereof) and then added in a state of solution to the emulsion. At this time, additives such as bases, acids, and surfactants can be made present jointly. For the dissolution, ultrasonic waves may be employed. As the method of adding this compound, there are employed a method in which the compound is dissolved in a volatile organic solvent, the solution is dispersed in a hydrophilic colloid, and the dispersion is added to the emulsion, as disclosed in U.S. Pat. No. 3,469,987; a method in which the compound is dispersed in a water-soluble solvent, and the dispersion is added to the emulsion, as disclosed in JP-B-46-24185; a method in which the compound is dissolved in a surfactant, and the solution is added to the emulsion, as disclosed in U.S. Pat. No. 3,822,135; a method in which the compound is dissolved using a compound to cause red shifting, and the solution is added to the emulsion, as disclosed in JP-A-51-74624; and a method in which the compound is dissolved in an acid not substantially containing water, and the solution is added to the emulsion, as disclosed in JP-A-50-80826. Besides, for the addition to the emulsion, methods as disclosed in U.S. Pat. Nos. 2,912,343, 3,342,605, 2,996,287 and 3,429,835 are employable.

In the invention, for the photographic emulsion that is in charge of the sensitization mechanism, any of silver bromide, silver iodobromide, silver chlorobromide, silver iodide, silver iodochloride, silver iodobromochloride, and silver chloride can be used as the silver halide. When the halogen composition of the outermost surface layer of the emulsion has an iodine content of preferably 0.1 mole % or more, more preferably 1 mole % or more, and most preferably 5 mole % or more, it is possible to construct a stronger multilayered adsorption structure.

The grain size distribution may be broad or narrow, but preferably narrow.

The silver halide grains of the photographic emulsion may be any of grains having a regular crystal form (such as cube, octahedron, tetradecahedron, and rhombic dodecahedron), grains having an irregular crystal form (such as sphere and table), grains having a higher-order plane ((hk1) plane), and mixtures of these grains. Preferably, the silver halide grains are tabular grains, and the details of the tabular grains will be described below. With respect to the grains having a higher-order plane, the description of Journal of Imaging Science, Vol. 30 (1986), pages 247 to 254 can be referred to.

Further, the silver halide photographic emulsion to be used in the invention may contain the foregoing silver halide grains singly or in admixture. The silver halide grains may have a structure in which the interior and the surface layer are made of a different phase; may have a multi-phase structure of a junction structure; may have a localized phase on the grain surface; may be made of a uniform phase over the whole of grain; or may be a mixture thereof.

These various emulsions may be of a surface latent image type in which a latent image is chiefly formed on the surface or of an internal latent image type in which the latent image is formed inside the grain.

In the invention, tabular silver halide grains whose halogen composition is silver chloride, silver bromide, silver chlorobromide, silver iodobromide, silver chloroiodobromide, or silver iodochloride are preferably used. As the tabular grains are preferable ones having a (100) or (111) main surface. A tabular grain having a (111) main surface (hereinafter referred to as "(111) tabular grain") generally has a triangle or hexagonal plane. In general, the more uniform the distribution, the higher the ratio of the tabular grains is. The hexagonal monodispersed tabular grain is described in JP-B-5-61205.

A tabular grain having a (100) plane as the main surface (hereinafter referred to as "(100) tabular grain") has a rectangular or square form. In this emulsion, grains having an adjacent edge ratio less than 5:1 as compared with needle grains are called a tabular grain. In tabular grains of silver chloride or those containing a large quantity of silver chloride, the (100) tabular grain is originally higher in stability of the main surface than the (111) tabular grain. In the case of the (111) tabular grain, it is necessary to stabilize the (111) main surface. Such is described in JP-A-9-80660, JP-A-9-80656, and U.S. Pat. No. 5,298,388.

The (111) tabular grain of silver chloride or containing a high content of silver chloride is disclosed in U.S. Pat. Nos. 4,414,306, 4,400,463, 4,713,323, 4,783,398, 4,962,491, 4,983,508, 4,804,621, 5,389,509, 5,217,858 and 5,460,934.

The (111) tabular grain having a high content of silver bromide is disclosed in U.S. Pat. Nos. 4,425,425, 4,425,426, 443,426, 4,439,520, 4,414,310, 4,430,048, 4,647,528, 4,665,012, 4,672,027, 4,678,745, 4,684,607, 4,593,964, 4,722,886, 4,722,886, 4,755,617, 4,755,456, 4,806,461, 4,801,522, 4,835,322, 4,839,268, 4,914,014, 4,962,015, 4,977,074, 4,985,350, 5,061,609, 5,061,616, 5,068,173, 5,132,203, 5,272,048, 5,334,469, 5,334,495, 5,358,840, and 5,372,927.

The (100) tabular grain to be used in the invention is disclosed in U.S. Pat. Nos. 4,386,156, 5,275,930, 5,292,632, 5,314,798, 5,320,938, 5,319,635 and 5,356,764, European Patent Nos. 569,971 and 737,887, JP-A-6-308648, and JP-A-9-5911.

As the silver halide emulsion to be used in the invention, are preferable tabular silver halide grains having a higher surface area/volume ratio, on which the sensitizing dye of the invention has been adsorbed. The tabular silver halide grain preferably has an aspect ratio of 2 or more, more preferably 5 or more, and most preferably 8 or more. Though the upper limit of the aspect ratio of the tabular silver halide grain is not particularly limited, it is preferably 1,000 or less, and more preferably 500 or less. The thickness of the tabular grain is preferably less than 0.2 $\mu$m, more preferably less than 0.1 $\mu$m, and most preferably less than 0.07 $\mu$m.

Here, what the aspect ratio of 2 or more means that silver halide grains having an aspect ratio (circle-corresponding diameter/grain thickness) of 2 or more account for 50% or more, preferably 70% or more, and most preferably 85% or more of the projected area of the whole of silver halide grains in the emulsion.

In order to prepare such thin tabular grains having a high aspect ratio, the following technologies are applicable.

In the tabular grains of the invention, it is desired that the dislocation line amount distribution between the grains is uniform. In the emulsion of the invention, the silver halide grains containing 10 or more dislocation lines per grain preferably account for from 100 to 50% (the number), more preferably from 100 to 70%, and most preferably from 100 to 90% of the whole of grains. A proportion of less than 50% is not desired from the viewpoint of uniformity between the grains.

In the invention, in the case of the proportion of the dislocation line-containing grains and the number of dislocation lines are determined, they are determined by directly observing the dislocation lines preferably with respect to at least 100 grains, more preferably with respect to 200 or more grains, and most preferably with respect to 300 or more grains.

As a protective colloid that is used during the preparation of the emulsion of the invention and a binder of other hydrophilic colloid layer, it is advantageous to use gelatin, but other hydrophilic colloids can be used.

Examples of the hydrophilic colloid that can be used include proteins such as gelatin derivatives, graft polymers of gelatin and other polymer, albumin, and casein; cellulose derivatives such as hydroxyethyl cellulose, carboxymethyl cellulose, and cellulose sulfates; sugar derivatives such as sodium alginate and starch derivatives; and various synthetic hydrophilic polymer substances such as homopolymers and copolymers (e.g., polyvinyl alcohol, polyvinyl alcohol partial acetal, poly-N-vinylpyrrolidone, polyacrylic acid, polymethacrylic acid, polyacrylamide, polyvinylimidazole, polyvinylpyrazole).

As the gelatin, are employable lime-processed gelatin, acid-processed gelatin, and enzyme-processed gelatin as described in Bull. Soc. Sci. Photo., Japan, No. 16, page 30 (1966). Also, hydrolyzates and enzymatic decomposition products of gelatin can be used.

In order to perform desalting, it is preferred that the emulsion of the invention is rinsed with water and dispersed in a newly prepared protective colloid. The temperature for water rinsing may be chosen depending on the purpose, but is preferably selected from the range of from 5° C. to 50° C. The pH during the water rinsing may be chosen depending on the purpose, but is preferably selected from the range of from 2 to 10, and more preferably from 3 to 8. The pAg during the water rinsing may be chosen depending on the purpose, but is preferably selected from the range of from 5 to 10. The water rinsing can be selected from a noodle washing method, a dialysis method using a semi-permeable membrane, a centrifugal method, a coagulation sedimentation method, and an ion exchange method. In the case of the coagulation sedimentation method, it can be selected from a method of using a sulfate, a method of using an organic solvent, a method using a water-soluble polymer, and a method of using a gelatin derivative.

During the preparation of the emulsion of the invention, it is preferred depending on the purpose to make a metal ion salt present during the grain formation, desalting step or chemical sensitization, or before the application. In the case of doping the grains, it is preferred to add the metal ion salt during the grain formation. During modification of the grain surface or use as a chemical sensitizer, the metal ion salt is preferably added after the grain formation but before completion of the chemical sensitization. Also, a method of doping the whole of grains or a method of doping only the core section of grain or only the shell section of grain may be selected. Examples of the metal that can be used include Mg, Ca, Sr, Ba, Al, Sc, Y, La, Cr, Mn, Fe, Co, Ni, Cu, Zn, Ga, Ru, Rh, Pd, Re, Os, Ir, Pt, Au, Cd, Hg, Tl, In, Sn, Pb, and Bi. These metals can be added in a state of salt that can be dissolved during the grain formation, such as ammonium salts, acetates, nitrates, sulfates, phosphates, hydrides, hexa-coordinated complex salts, and tetra-coordinated complex salts. Examples of metal salt include $CdBr_2$, $CdCl_2$, $Cd(NO_3)_2$, $Pb(NO_3)_2$, $Pb(CH_3COO)_2$, $K_3[Fe(CN)_6]$, $(NH_4)_4[Fe(CN)_6]$, $K_3IrCl_6$, $(NH_4)_3RhCl_6$, and $K_4Ru(CN)_6$. A ligand of the coordinated compound can be selected from halo, aquo, cyano, cyanate, thiocyanate, nitrosyl, thionitrosyl, oxo, and carbonyl. These metal compounds can be used singly or in admixture of two or more thereof.

Preferably, the metal compound is dissolved in a proper organic solvent such as methanol and acetone and then added. In order to stabilize the solution, there can be employed a method in which a hydrogen halide aqueous solution (such as HCl and HBr) or a halogenated alkali (such as KCl, NaCl, Kbr, and NaBr) is added. If desired, an acid or an alkali may be added. The metal compound may be added to a reaction vessel before the grain formation or on the way of the grain formation. Further, the metal compound can be added to a water-soluble silver salt (such as $AgNO_3$) or a halogenated alkali aqueous solution (such as NaCl, KBr, and KI) and continuously added during the formation of silver halide grains. Moreover, the water-soluble silver salt and the halogenated alkali may be prepared as independent solutions and then continuously added at a proper timing during the grain formation. In addition, it is also preferred to combine various addition methods.

There may be the case where a method of adding a chalcogen compound during the preparation of emulsion as disclosed in U.S. Pat. No. 3,772,031 is useful. In addition to S, Se and Te, cyan salts, thiocyan salts, selenocyan salts, carbonates, phosphates, or acetates may be contained.

The silver halide grains of the invention can be subjected to at least one of sulfur sensitization, selenium sensitization, gold sensitization, palladium sensitization, noble metal sensitization, and reduction sensitization at an arbitrary stage of the production process of silver halide emulsion. It is preferred to combine two or more sensitization methods. It is possible to prepare various types of emulsions by regulating the timing of the chemical sensitization. There are a type in which a chemical sensitization nucleus is embedded in the grain, a type in which a chemical sensitization nucleus is embedded in a position shallow from the grain surface, and a type in which a chemical sensitization nucleus is prepared on the grain surface. In the emulsion of the invention, if desired, the place of the chemical sensitization nucleus can be chosen, but it is preferred to prepare at least one chemical sensitization nucleus in the vicinity of the grain surface.

As one of examples of the chemical sensitization that can be preferably carried out in the invention, chalcogen sensitization and noble metal sensitization can be employed singly or in combination. For example, the chemical sensitization can be carried out by using active gelatin, as described in T. H. James, *The Theory of the Photographic Process*, 4th ed., Macmillan (1977), pages 67 to 76; and it can be carried out by using sulfur, selenium, tellurium, gold, platinum, palladium, or iridium, or a combination of a plurality of these chemical sensitizers at a pAg of from 5 to 10 and at a pH of from 5 to 8 at a temperature of from 30 to 80° C., as described in *Research Disclosure*, Vol. 120, April 1974, 12008, *Research Disclosure*, Vol. 34, June 1975, 13452, U.S. Pat. Nos. 2,642,361, 3,297,446, 3,772,031, 3,857,711, 3,901,714, 4,266,018 and 3,904,415, and British Patent No. 1,315,755. In the noble metal sensitization, salts of noble metals such as gold, platinum, palladium, and iridium can be used. Especially, gold sensitization and palladium sensitization as well as a combination of the both are preferred. In the case of the gold sensitization, known compounds such as auric chloride, potassium chloroaurate, potassium aurithiocyanate, gold sulfide, and gold selenide can be used. The palladium compound means a divalent or tetravalent palladium salt. The preferred palladium compound is represented by $R_2PdX_6$ or $R_2PdX_4$, wherein R represents a hydrogen atom, an alkali metal atom, or an ammonium group; and X represents a halogen atom such as a chlorine atom, a bromine atom, and an iodine atom.

Specifically, are preferable $K_2PdCl_4$, $(NH_4)_2PdCl_6$, $Na_2PdCl_4$, $(NH_4)_2PdCl_4$, $Li_2PdCl_4$, $Na_2PdCl_6$, and $K_2PdBr_4$. The gold compound and the palladium compound are preferably used in combination with a thiocyanate or a selenocyanate.

Examples of the sulfur sensitizer include hypo, thiourea-based compounds, rhodanine-based compounds, and sulfur-containing compounds as described in U.S. Pat. Nos. 3,857,711, 4,266,018 and 4,054,457. As a useful chemical sensitization assistant, are employable compounds that are known to retard fogging during the chemical sensitization and increase the sensitivity, such as azaindenes, azapyridazines, and azapyrimidines. Examples of chemical sensitization assistant modifiers are described in U.S. Pat. Nos. 2,131,038, 3,411,914 and 3,554,757, JP-A-58-126526, and Duffin, *Photographic Emulsion Chemistry*, pages 138 to 143.

Preferably, the emulsion of the invention is used in combination of the gold sensitization. A preferred amount of the gold sensitizer is from $1\times10^{-4}$ to $1\times10^{-7}$ moles, and more preferably from $1\times10^{-5}$ to $5\times10^{-7}$ moles. A preferred amount of the palladium compound is in the range of from $1\times10^{-3}$ to $5\times10^{-7}$ moles. A preferred amount of the thiocyan compound or selenocyan compound is in the range of from $5\times10^{-2}$ to $1\times10^{-6}$ moles.

A preferred amount of the sulfur sensitizer that is used for the silver halide grains of the invention is from $1\times10^{-4}$ to $1\times10^{-7}$ moles, and more preferably from $1\times10^{-5}$ to $5\times10^{-7}$ moles per mole of the silver halide.

As the sensitization for the emulsion of the invention, selenium sensitization is preferable. In the selenium sensitization, known instable selenium compounds can be used. Specific examples of the selenium compound include colloidal metallic selenium, selenoureas (such as N,N-dimethylselenourea and N,N-diethylselenourea), selenoketones, and selenoamides. There may be the case where it is preferred to combine the selenium sensitization with sulfur sensitization or noble metal sensitization or a combination of the both.

Preferably, the silver halogen emulsion of the invention is subjected to reduction sensitization during the grain formation, after the grain formation and before or during the chemical sensitization, or after the chemical sensitization.

Here, as the reduction sensitization, any of a method in which a reduction sensitizer is added to the silver halide emulsion, a method called silver ripening, in which the silver halide emulsion is grown or ripened in a low-pAg atmosphere at a pAg of from 1 to 7, and a method called high-pH ripening, in which the silver halide emulsion is grown or ripened in a high-pH atmosphere at a pH of from 8 to 11 can be used. A combination of two or more of these methods can also be employed.

The method of adding the reduction sensitization is preferred from the standpoint that the level of the reduction sensitization can be delicately regulated.

As the reduction sensitizer, for example, stannous salts, ascorbic acid and derivatives thereof, amines and polyamines, hydrazine derivatives, formamidinesulfinic acid, silane compounds, and borane compounds. These compounds may be used in admixture of two or more thereof. Preferred examples of the reduction sensitizer include stannous chloride, thiourea dioxide, dimethylamineborane, and ascorbic acid and derivatives thereof. The addition amount of the reduction sensitizer relies upon the production conditions of emulsion. Accordingly, it is required to select the addition amount of the reduction sensitizer, but it is suitably in the range of from $10^{-7}$ to $10^{-3}$ moles per mole of the silver halide.

For example, the reduction sensitizer is dissolved in water or an organic solvent (such as alcohols, glycols, ketones, esters, and amides) and added during the grain growth. Though the reduction sensitizer may be added in advance to a reaction vessel, a method of adding it at a proper timing during the grain growth. Further, there may be employed a method in which the reduction sensitizer is added in advance in an aqueous solution of a water-soluble silver salt or water-soluble alkali halide, and the silver halide grains are precipitated using the resulting aqueous solution. Moreover, a method in which a solution of the reduction sensitizer is dividedly added with the growth of grains or continuously added over a long period of time is also preferred.

Preferably, an oxidizing agent to silver is added in the production step of the emulsion of the invention. The oxidizing agent to silver as referred to herein means a compound having an action such that it acts to metallic silver and converts it into a silver ion. Especially, compounds capable of converting extremely fine silver grains formed as a by-product during the formation step of the silver halide grains and the chemical sensitization step into a silver ion are effective. The silver ion as formed may form sparingly water-soluble silver salts such as silver halides, silver sulfide, and silver selenide, or may form water-soluble silver salts such as silver nitrate. The oxidizing agent to silver may be any of an inorganic material and an organic material. Examples of the inorganic oxidizing agent include ozone; hydrogen peroxide and adducts thereof (such as $NaBO_2.H_2O_2.3H_2O$, $2NaCO_3.3H_2O_2$, $Na_4P_2O_7.2H_2O$, and $2Na_2SO_4.H_2O_2.2H_2O$); oxyacid salts such as peroxy acid salts (such as $K_2S_2O_8$, $K_2C_2O_6$, and $K_2P_2O_8$), peroxy complex compounds (such as $K_2[Ti\ (O_2)\ C_2O_4].3H_2O$, $4K_2SO_4.Ti(O_2)OH.SO_4.2H_2O$, and $Na_3[VO(O_2)\ (C_2H_4)_2].6H_2O$), permanganates (such as $KMnO_4$), chromates (such as $K_2Cr_2O_7$) halogen elements such as iodine and bromine; perhalic acid salts (such as potassium periodate), salts of high-valence metals (such as hexacyanoferric acid potassium), and thiosulfonic acid salts.

Examples of the organic oxidizing agent include quinones such as p-quinone; organic peroxides such as peracetic acid and perbenzoic acid; and compounds capable of releasing an active halogen (such as N-bromosuccinimide, chloramine T and chloramines B).

As the preferred oxidizing agent of the invention, are enumerated inorganic oxidizing agents including ozone, hydrogen peroxide and adducts thereof, a halogen element, and thiosulfonic acid salts; and organic oxidizing agents including quinones. It is a preferred embodiment to use the reduction sensitization in combination with the oxidizing agent to silver. Such can be achieved by a method selected from a method in which the oxidizing agent is used, and the reduction sensitization is then performed, a method in which the reduction sensitization is performed, and the oxidizing agent is then used, and a method in which the both are present together. Such a method can be carried out in the step of grain formation or in the step of chemical sensitization.

The photographic emulsion to be used in the invention can contain various compounds for the purposes of preventing the fogging or stabilizing the photographic performance during the production step, preservation or photographic processing of photographic materials. That is, many compounds that are known as an antifoggant or a stabilizer, such as thiazoles (such as benzothiazolium salts), nitroimidazoles, nitrobenzimidazoles, chlorobenzimidazoles, bromobenzimidazoles, mercaptothiazoles, mercaptobeznzothaizoles, mercaptobenzimidazoles, mercaptothiadiazoles, aminotriazoles, benzotriazoles, nitrobenzotriazoles, mercaptotetrazoles (especially, 1-phenyl-5-mercaptotetrazole), mercaptopyrimidines, mercaptotriazines, thioketo compounds (such as oxadolinethione), and azaindenes (such as triazaindenes, tetraazaindenes (especially, 4-hydroxy-susbtituted (1,3,3a,7a)tetrazaazaindenes), and pentaazaindens), can be added. Further, compounds as described in U.S. Pat. Nos. 3,954,474 and 3,982,947 and JP-B-52-28660 can be used. Moreover, compounds as described in JP-A-63-212932 are also preferred. The antifoggant and stabilizer can be added at any timing, for example, before the grain formation, during the grain formation, after the grain formation, in the water rinsing step, during the dispersion after the water rinsing, before the chemical sensitization, during the chemical sensitization, after the chemical sensitization, or before the application, depending on the purpose. When the antifoggant and stabilizer are added during the preparation of the emulsion, not only the original antifogging effect and stabilization effect are revealed, but also various purposes such as to control the crystal habit of grain, to make the grain size small, to reduce the dissolution of grains, to control the chemical sensitization, and to control the alignment of dyes are revealed.

The silver halide emulsion as prepared by the invention can be used as any of color photographic materials and black-and-white photographic materials. Examples of the color photographic materials include color printing papers, color photographic films, color reversal films, and color diffusion transfer films; and examples of the black-and-white photographic materials include general photographic films, X-ray films, films for medical diagnosis, films for printing photosensitive material, and diffusion transfer films.

In the fields of films for medical diagnosis and films for printing photosensitive material, it is possible to carry out exposure efficiently by a laser image setter or a laser imager.

The technologies in these fields are described in JP-A-7-287337, JP-A-4-335342, JP-A-5-313289, JP-A-8-122954, and JP-A-8-292512.

Further, the silver halide emulsion of the invention can be used as a heat-developable photosensitive material. For example, there are known materials containing a photosensitive layer or layers having a catalytically effective amount of a photo catalyst (such as silver halides), a reducing agent, a reducible silver salt (such as organic silver salts), and optionally a color toner for controlling the color tone of silver, dispersed in a binder matrix. These are described in U.S. Pat. Nos. 3,152,904, 3,457,075, 2,910,377 and 4,500,626, JP-B-43-4924, JP-A-11-24200, JP-A-11-24201, JP-A-11-30832, JP-A-11-84574, JP-A-11-65021, JP-A-11-109547, JP-A-11-125880, JP-A-11-129629, JP-A-11-133536, JP-A-11-133537, JP-A-11-133538, JP-A-11-133539, JP-A-11-133542, JP-A-11-133543, JP-A-11-223898, JP-A-11-352627, JP-A-6-130607, JP-A-6-332134, JP-A-332136, JP-A-6-347970, JP-A-7-261354, and Japanese Patent Application No. 2000-89436.

The compound of the invention can be suitably used for diffusion transfer photosensitive materials. Among them, the heat-developable diffusion transfer mode can be referred to the methods as described in Japanese Patent Application Nos. 10-265273 (using a preformed dye) and 2000-89436 (using a coupling forming dye); and the instant photographic mode can be referred to the method as described in Japanese Patent Application No. 11-89801.

As to the preparation method of the photographic emulsion to be used in the invention, the description at from column 63, line 36 to column 65, line 2 of JP-A-10-239789 can be applied.

Further, as to additives such as color couplers, additives for photographic materials, kind of photosensitive materials to which the invention is applied, and processing of photosensitive materials, the description at from column 65, line 3 to column 73, line 13 of JP-A-10-239789 can be applied.

For the silver halide photographic material of the invention, are used the foregoing various additives. Besides, various additives can be used depending on the purpose.

These additives are described in detail in *Research Disclosure*, Item 17643 (December 1978), ibid., Item 18716 (November 1979), and ibid., Item 308119 (December 1989), and the corresponding parts are tabulated below.

| Kind of additives | RD17643 | RD18716 | RD308119 |
| --- | --- | --- | --- |
| 1. Chemical sensitizer | Page 23 | Page 648, right column | Page 996 |
| 2. Sensitivity enhancing agent | | Page 648, right column | |
| 3. Spectral sensitizer and supersensitizer | Pages 23 to 24 | Page 648, right column to page 649, right column | Page 996, right to page 998, right |
| 4. Whitening agent | Page 24 | | |
| 5. Antifoggant and stabilizer | Pages 24 to 25 | Page 649, right column | Page 998, right to page 1000, right |
| 6. Light absorber, filter, and UV absorber | Pages 25 to 26 | Page 649, right column to page 650, left column | Page 1003, left to page 1003, right |
| 7. Anti-staining agent | Page 25, right column | Page 650, left column to right column | Page 1002, right |
| 8. Dye image stabilizer | Page 25 | | Page 1002, right |
| 9. Film hardener | Page 26 | Page 651, left column | Page 1004, right to page 1005, left |
| 10. Binder | Page 26 | Page 651, left column | Page 1003, right to page 1004, right |
| 11. Plasticizer and lubricant | Page 27 | Page 650, right column | Page 1006, left to page 1006, right |
| 12. Coating aid and surfactant | Pages 26 to 27 | Page 650, right column | Page 1005, left to page 1006, left |
| 13. Anti-static | Page 27 | Page 650, right column | Page 1006, right to page 1007, left |
| 14. Matting agent | | | Page 1008, left to page 1009, left |

The technologies such as layer alignment, which can be used for the emulsion of the invention and the photographic material using the emulsion, silver halide emulsions, dye forming couplers, functional couplers such as DIR couplers, various additives, and development processings are described in European Patent No. 0565096A1 (published Oct. 13, 1993) and the patents cited therein, and the respective items and corresponding parts are tabulated below.

| | |
| --- | --- |
| 1. Layer construction: | Page 61, lines 23 to 35, page 61, line 41 to page 62, line 14 |
| 2. Interlayer: | Page 61, lines 36 to 40 |
| 3. Interlayer effect imparting agent: | Page 62, lines 15 to 18 |
| 4. Halogen composition of silver halide: | Page 62, lines 21 to 25 |
| 5. Crystal habit of silver halide: | Page 62, lines 26 to 30 |
| 6. Grain size of silver halide grain: | Page 62, lines 31 to 34 |
| 7. Production process of emulsion: | Page 62, lines 35 to 40 |
| 8. Grain size distribution of silver halide: | Page 62, lines 41 to 42 |
| 9. Tabular grain: | Page 62, lines 43 to 46 |
| 10. Internal structure of grain: | Page 62, lines 47 to 53 |
| 11. Latent image formation type of emulsion: | Page 62, line 54 to page 63, line 5 |
| 12. Physical ripening and chemical sensitization of emulsion: | Page 63, lines 6 to 9 |
| 13. Use of mixed emulsion: | Page 63, lines 10 to 13 |
| 14. Fogging agent: | Page 63, lines 14 to 31 |
| 15. Non-photosensitive emulsion: | Page 63, lines 32 to 43 |
| 16. Coverage of silver: | Page 63, lines 49 to 50 |
| 17. Formaldehyde scavenger: | Page 64, lines 54 to 57 |
| 18. Mercapto-based antifoggant: | Page 65, lines 1 to 2 |
| 19. Releasing agent such as fogging agent: | Page 65, lines 3 to 7 |
| 20. Dye: | Page 65, lines 7 to 10 |
| 21. Whole of color coupler: | Page 65, lines 11 to 13 |
| 22. Yellow, magenta and cyan couplers: | Page 65, lines 14 to 25 |
| 23. Polymer coupler: | Page 65, lines 26 to 28 |
| 24. Diffusible dye forming coupler: | Page 65, lines 29 to 31 |
| 25. Colored coupler: | Page 65, lines 32 to 38 |
| 26. Whole of functional coupler: | Page 65, lines 39 to 44 |
| 27. Bleaching promoter-releasing coupler: | Page 65, lines 45 to 48 |

-continued

| | |
|---|---|
| 28. Development promoter-releasing coupler: | Page 65, lines 46 to 53 |
| 29. Other DIR couplers: | Page 65, line 54 to page 66, line 4 |
| 30. Coupler dispersion method: | Page 66, lines 5 to 28 |
| 31. Antiseptic and anti-mold agent: | Page 66, lines 29 to 33 |
| 32. Kind of photographic material: | Page 66, lines 34 to 36 |
| 33. Film thickness and swelling rate of photosensitive layer: | Page 66, line 40 to page 67, line 1 |
| 34. Back layer: | Page 67, lines 3 to 8 |
| 35. Whole of development processing: | Page 67, lines 9 to 11 |
| 36. Developing solution and developer: | Page 67, lines 12 to 30 |
| 37. Additives of developing solution: | Page 67, lines 31 to 44 |
| 38. Reversal processing: | Page 67, lines 45 to 56 |
| 39. Degree of opening of processing solution: | Page 67, line 57 to page 68, line 12 |
| 40. Development time: | Page 68, lines 13 to 15 |
| 41. Blix, bleaching and fixing: | Page 68, line 16 to page 69, line 31 |
| 42. Automatic processor: | Page 69, lines 32 to 40 |
| 43. Water rinsing, rinsing and stabilization: | Page 69, line 41 to page 70, line 18 |
| 44. Replenishment and reuse of processing solution: | Page 70, lines 19 to 23 |
| 45. Incorporation of developer into photographic material: | Page 70, lines 24 to 33 |
| 46. Development processing temperature: | Page 70, lines 34 to 38 |
| 47. Use for lens-equipped film: | Page 70, lines 39 to 41 |

The exposure method the silver halide photographic material of the invention will be described below.

The exposure for obtaining a photographic image can be carried out in a usual manner. In other words, various known light sources such as natural light (sunlight), tungsten lamps, fluorescent lamps, mercury vapor lamps, xenon arc lamps, carbon arc lamps, xenon flash lamps, laser, LED, and CRT can be used. Further, lights emitting from fluorescent materials excited by electron beams, X-rays, γ(gamma)-rays, or α-rays can also be used for the exposure.

In the invention, a laser light source is often used preferably. Examples of the laser light include lasers using as a laser oscillation medium a helium-neon gas, an argon gas, a krypton gas, or a carbon dioxide gas; lasers using as an oscillation medium a solid such as ruby and cadmium; liquid lasers; and semiconductor lasers. The laser light is different from a usual light used for illumination and is a coherent light having uniform phases at a single frequency and a sharp directional property. Accordingly, the silver halide photographic material for achieving the exposure using such a laser light as the light source is required to have a spectral characteristic adaptive to the emission wavelength of the laser to be used.

Among the foregoing lasers, is preferable a semiconductor laser.

The compound of the invention can be used as a filter dye, an irradiation preventing dye, or an anti-halation dye for the purposes of enhancing the sharpness and color separation performance, other than the sensitizing dye.

This compound can be contained in coating solutions for the silver halide photographic material layers, filter layer, and/or anti-halation layer in the customary manner. The amount of the dye to be used is sufficiently one necessary for coloring the photographic layer, and can be properly chosen depending on the use purpose by those skilled in the art. In general, the dye is preferably used such that the optical density is in the range of from 0.05 to 3.0. The dye may be added in any step before the application.

A polymer having a charge opposite to the dye ion can be made co-present as a mordant in the layer, thereby localizing the dye in a specific layer by a mutual action with the dye molecule.

As the polymer mordant, can be enumerated those described in U.S. Pat. Nos. 2,548,564, 4,124,386, 3,625,694, 3,958,995, 4,168,976 and 3,445,231.

The compound of the invention can be added to any desired layer such as an interlayer, a protective layer, and a back layer, other than the photosensitive emulsion layers.

The compound of the invention can be used for various non-silver halide mode photo image formation method as a photo sensitizer (photo-charge separating agent) and can also be used as a photo catalyst or a photo hydrogen generator.

In the invention, the light absorption intensity means a light absorption area intensity by the sensitizing dye per unit surface area of grain and is defined as a value obtained by integrating an optical density, Log $(I_0/(I_0-I))$ (wherein I represents a quantity of light incident to the unit surface area of grain, and I represents a quantity of light as absorbed by the sensitizing dye on the surface) by the wave number ($cm^{-1}$). The integrating range is from 5,000 $cm^{-1}$ to 35,000 $cm^{-1}$.

With respect to the silver halide photographic emulsion according to the invention, it is preferred that silver halide grains having a light absorption intensity of 100 or more in the case of grains having a spectral absorption maximum wavelength of 500 nm or more, or those having a light absorption intensity of 60 or more in the case of grains having a spectral absorption maximum wavelength of less than 500 nm, are contained in a proportion of 1/2 or more of the projected area of the whole of silver halide grains. Further, in the case of grains having a spectral absorption maximum wavelength of 500 nm or more, the light absorption intensity is preferably 150 or more, more preferably 170 or more, and most preferably 200 or more. In the case of grains having a spectral absorption maximum wavelength of less than 500 nm, the light absorption intensity of 90 or more, more preferably 100 or more, and most preferably 120 or more. In any of these cases, though the upper limit of the light absorption intensity is not defined, the light absorption intensity is preferably 2,000 or less, more preferably 1,000 or less, and most preferably 500 or less.

With respect to grains having a spectral absorption maximum wavelength of less than 500 nm, it is preferred that the spectral absorption maximum wavelength is 350 nm or more.

As one example of the method of measuring the light absorption intensity, can be enumerated a method using a microspectrophotometer. The microspectrophotometer is a device capable of measuring an absorption spectrum of a fine area and can measure a transmission spectrum of one grain. With respect to the measurement of the absorption spectrum of one grain by miscrospectrophotometry, the report of Yamashita, et al. (Pre-print of the 1996 Annual Meeting of Society of Photographic Science and Technology, Japan, page 15) can be referred to. The absorption intensity per grain is determined from this absorption spectrum. Since the light transmitting the grain is absorbed on two surfaces of an upper surface and a lower surface, the absorption intensity per unit area of the grain surface can be determined as a ½ value of the absorption intensity per grain, as obtained by the foregoing method. At this time, an interval where the absorption spectrum is integrated is from 5,000 $cm^{-1}$ to 35,000 $cm^{-1}$ according to the definition of the light absorption intensity. But, it may be experimentally allowed to integrate an interval containing a section of about 500 $cm^{-1}$ before and after the interval where the absorption by the sensitizing dye is present.

Further, the light absorption intensity is a value determined unequivocally by the oscillator strength of the sensitizing dye and the number of adsorbed molecules per unit area and can be calculated by determining the oscillator strength of the sensitizing dye, the adsorption amount of the dye, and the grain surface area.

The oscillator strength of the sensitizing dye can be experimentally determined as a value in proportion to the absorption area intensity of the sensitizing dye solution (optical density×$cm^{-1}$). When the absorption area intensity per 1M of the dye is defined as A (optical density×$cm^{-1}$), the adsorption amount of the sensitizing dye is defined as B (mole/mole-Ag), and the grain surface area is defined as C ($m^2$/mole-Ag), the light absorption intensity can be determined according to the following equation within an error range of about 10%.

$$0.156 \times A \times B / C$$

Even when the light absorption intensity is calculated from this equation, a value substantially identical with the light absorption intensity as measured according to the foregoing definition (a value obtained by Log ($I_0/(I_0-I)$) by the wave number ($cm^{-1}$)).

As the method of increasing the light absorption intensity, there are a method of adsorbing the dye chromophore in more than one layer on the grain surface, a method of increasing the molecular absorption coefficient, and a method of decreasing the dye-occupied area, and any of these methods can be employed. Among them, is preferable the method of adsorbing the dye chromophore in more than one layer on the grain surface.

Here, the state that the dye chromophore is adsorbed in more than one layer on the grain surface means that the dye restrained in the vicinity of the silver halide grains is present in more than one layer, but the dye present in the dispersion medium is not included. The terms "more than one layer" as referred to herein also include the case where as in the invention, the dye chromophore is covalently linked to the compound such as the dye adsorbed on the grain surfaces. At this time, it is required that the spectral sensitization occurs by the dye not directly adsorbed on the grain surfaces. For achieving this matter, transmission of an excitation energy from the dye not directly adsorbed on the silver halide grains to the dye directly adsorbed on the grains is required. Accordingly, in the case where the transmission of the excitation energy is required to occur over 10 stages, the ultimate transmission efficiency of the excitation energy becomes low, and hence, such is not preferred. As one example of this matter, is enumerated the case of JP-A-2-113239, i.e., a major part of the dye chromophore such as a polymer dye is present in the dispersion medium, and hence, 10 or more stages are required for the transmission of the excitation energy.

The adsorption of the dye chromophore on the silver halide grains preferably occurs in 1.5 or more layers, more preferably 1.7 or more layers, and most preferably 2 or more layers.

In the invention, the state where the chromophore is adsorbed in more than one layer on the silver halide grains means the state where when the saturated adsorption amount per unit area as attained by a dye having a smallest dye-occupied area on the silver halide grain surface among the sensitizing dyes to be added to the emulsion is defined as a one-layer saturated coverage, the adsorption amount per unit area of the dye chromophore to the one-layer saturated coverage is high. Further, the number of adsorption layers means the adsorption amount when the one-layer saturated coverage is standardized. Here, in the case of the dye to which the dye chromophore is covalently linked, the dye-occupied area of the individual dyes in the non-linked state can be standardized.

The dye-occupied area can be determined from an adsorption isotherm showing the relationship between the liberated dye density and the adsorbed dye density and a grain surface area. The adsorption isotherm can be, for example, determined with reference to A. Herz, et al., *Adsorption from Aqueous Solution, Advances in Chemistry Science*, No. 17, page 173 (1968).

The adsorption amount of the sensitizing dye on the emulsion grains can be determined by the following two methods: a method in which the dye-adsorbed emulsion is separated into emulsion grains and a supernatant gelatin aqueous solution by a centrifugal separator, a non-adsorbed dye density is determined by the spectral absorption measurement of the supernatant, and the adsorbed dye amount is obtained by subtracting the non-adsorbed dye density from the added dye amount; and a method in which the precipitated emulsion grains are dried, a certain amount of the precipitate is dissolved in a mixed solution (1:1) of an sodium thiosulfate aqueous solution and methanol, and the spectral absorption of the solution is measured to determine the adsorbed dye amount. In the case of using plural kinds of sensitizing dyes, the adsorption amount of the individual dyes can be determined by means such as high-performance liquid chromatography.

The dye-occupied area can be experimentally determined. Usually, since the molecule-occupied area of the sensitizing dye to be used is about 80 square-angstrom, the number of adsorption layers can be estimated while simply considering that the dye-occupied area of all dyes is 80 square-angstrom.

In the silver halide photographic emulsion containing the compound of the invention as a sensitizing dye, a distance between the shortest wavelength and the longest wavelength exhibiting 50% of each of a maximum value (Amax) of the spectral absorbance and a maximum value (Smax) of the spectral sensitivity by the sensitizing dye is preferably 120 nm or less, and more preferably 100 nm or less.

Further, a distance between the shortest wavelength and the longest wavelength exhibiting 80% of each of Amax and Smax is preferably 20 nm or more, and preferably 100 nm or less, more preferably 80 nm or less, and most preferably 50 nm or less.

Moreover, a distance between the shortest wavelength and the longest wavelength exhibiting 20% of each of Amax and Smax is preferably 180 nm or less, more preferably 150 nm or less, further preferably 120 nm or less, and most preferably 100 nm or less.

The longest wavelength exhibiting a spectral absorbance of 50% of Amax or Smax is preferably from 450 nm to 510 nm, or from 560 nm to 610 nm, or from 640 to 730 nm.

In the invention, in the case where the dye chromophore is adsorbed in plural layers on the silver halide grains, any reduction potential and oxidation potential may be employed with respect to the dye chromophore of the first layer directly adsorbing the silver halide grains and the dye chromophore of the second or et seq. layers. It is preferred from the standpoints of the promotion of electron transfer or prevention of reverse electron transfer from the dye of the second or et seq. layers to the dye of the first layer that the reduction potential of the dye chromophore of the first layer is nobler than a value obtained by subtracting 0.2 V from the value of the reduction potential of the dye chromophore of the second or et seq. layers. Preferably, the reduction potential of the dye chromophore of the first layer is nobler than the value of the reduction potential of the dye chromophore of the second or et seq. layers.

The reduction potential and oxidation potential can be measured by various methods, and preferably by phase discrimination type second harmonic alternating current polarography to determine a precise value. The measurement of potential by the phase discrimination type second harmonic alternating current polarography is described in *Journal of Imaging Science*, Vol. 30, page 27 (1986).

As the dye chromophore of the second or et seq. layers, luminescent dyes are preferable. As the kind of the luminescent dye, ones having a skeleton structure of a dye to be used for dye lasers are preferred. These are summarized in Mitsuo Maeda, *Review of Laser Engineering*, Vol. 8, pages 694, 803 and 958 (1980), ibidi., Vol. 9, page 85 (1981), and F. Sehaefer, *Dye Lasers*, Springer (1973).

It is preferred from the standpoint of the energy transfer efficiency from the dye of the second or et seq. layers to the dye of the first layer that the absorption maximum wavelength of the dye chromophore of the first layer in the silver halide photographic material is longer than the absorption maximum wavelength of the dye chromophore of the second or et seq. layers that the emission of the dye chromophore of the second or et seq. layers overlaps the absorption of the dye chromophore of the first layer. Further, it is preferred that the dye chromophore of the first layer forms a J-associated body. Moreover, in order to have absorption and spectral sensitivity within a desired wavelength range, it is preferred that the dye chromophore of the second or se seq. layers also forms a J-associated body.

The energy transfer efficiency of the excitation energy of the dye of the second layer to the dye of first layer is preferably 30% or more, more preferably 60% or more, and most preferably 90% or more. The excitation energy of the dye of the second layer as referred to herein means an energy that the dye in the excited state as generated upon absorption of the light energy of the dye of the second layer. In the case where the excitation energy that a certain molecule has transfers to other molecule, it is considered that the excitation energy transfers via an excitation electron transfer mechanism, a Forster model energy transfer mechanism, a Dextor model energy transfer mechanism, etc. Accordingly, in the multilayered adsorption system of the invention, it is preferred that the conditions for causing the excitation energy transfer with good efficiency that can be considered from these mechanisms be met. In addition, it is particularly preferred that the conditions for causing the Forster model energy transfer mechanism be met.

The efficiency of the energy transfer of the dye of the second layer to the dye of the first layer can be determined as a spectral sensitization efficiency at the excitation of the dye of the second layer/a spectral sensitization efficiency at the excitation of the dye of the first layer.

The meanings of the terms as used in the invention will be described below.

Dye-Occupied Area:

An occupied area per molecule of the dye, which can be experimentally determined from the adsorption isotherm. In the case of a dye to which the dye chromophore is covalently linked, the dye-occupied area of the individual dyes in the non-linked state is a standard. It is simply 80 square-angstrom.

Monolayer Saturated Coverage:

A dye adsorption amount per unit grain surface area at the application of monolayer saturation, which is an inverse of the minimum dye-occupied area of the dyes added.

Multilayer Adsorption:

A state where the adsorption amount of the dye chromophore per unit grain surface area is higher than the monolayer saturated coverage. Incidentally, since the multilayer adsorption means the state where the adsorption amount of the dye chromophore per unit grain surface area is higher than the monolayer saturated coverage, in the case where two dye chromophores are adsorbed by one layer as a dye to which they are covalently linked, they are adsorbed by two layers.

Number of Adsorption Layers:

An adsorption amount of the dye chromophore per unit grain surface area when the monolayer saturated coverage is a standard. Incidentally, in the case of a compound to which two dye chromophores are covalently linked, the "(adsorption amount)×2" is defined as the number of adsorption layers. For example, in the case where the dye to which two dye chromophores are covalently linked is identical in the dye-occupied area and adsorption amount with a certain non-linked model dye, the number of adsorption layers is 2.

EXAMPLES

The invention will be described below with reference to the Examples, but it should not be construed that the invention is limited thereto.

Example 1

(1) Synthesis Examples of Compound D-3 of the Invention:
Synthesis example of D-3

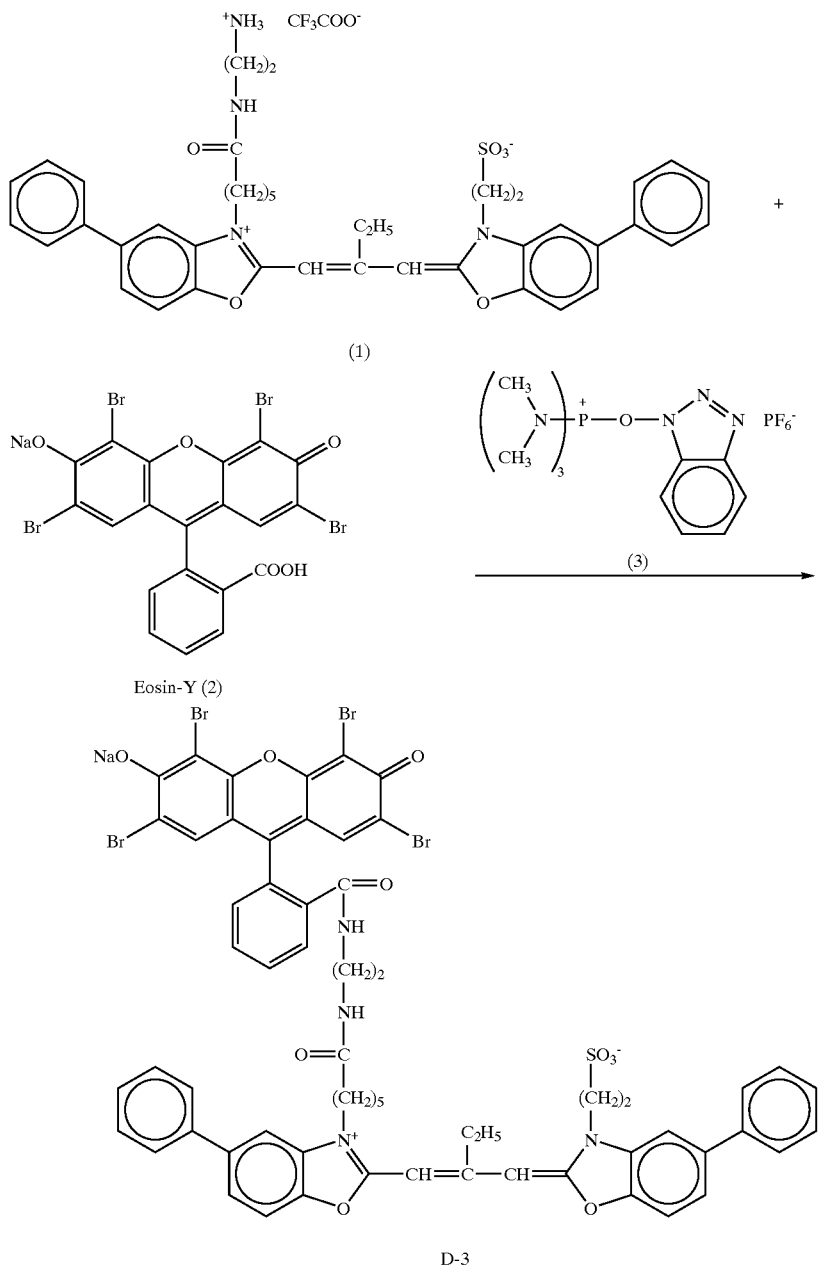

In 200 mL of dimethyl sulfoxide were dissolved 8.35 g (10 mmoles) of a cyanine dye [1] as synthesized by the method of Japanese Patent Application No. 2001-215424, 6.92 g (10 mmoles) of Eosin Y [2] (manufactured by Tokyo Kasei Kogyo Co., Ltd.), and 2.7 g (20 mmoles) of 1-hydroxybenzotriazole, which was then stirred at 60° C. for 30 minutes to prepare a uniform solution. To the solution were added 4.86 g (11 mmoles) of a phosphonium salt [3] and 5.2 g (40 mmoles) of diisopropylethylamine, and the mixture was stirred at 60° C. for 30 minutes. After cooling, 1,000 mL of acetone was added to the reaction mixture, and deposited crystals were separated by filtration. The crystals were dissolved in methanol, to which was then added a methanol solution containing 0.81 g (10 mmoles) of sodium sulfate. To the mixture was further added isopropyl alcohol, and formed crystals were separated by filtration and then rinsed with methanol, followed by recrystallization from methanol-isopropyl alcohol. The resulting crystals were dried in vacuo to obtain 10.4 g (yield: 75%) of the desired compound D-3 as a crystal. Incidentally, the structure was confirmed by NMR spectrum, MS spectrum and mass analysis.

Other compounds of the invention can be synthesized by the same method as described above.

Example 2

(Preparation of Seed Emulsion a)

An aqueous solution (1,164 mL) containing 0.017 g of KBr and 0.4 g of oxidized gelatin having an average molecular weight of 20,000 was stirred while keeping at 35° C. An aqueous solution of $AgNO_3$ (1.6 g), an aqueous solution of KBr and an aqueous solution of oxidized gelatin (2.1 g) having an average molecular weight of 20,000 were added over 48 seconds by the triple jet method. At this time, a silver potential was kept at 13 mV with respect to a saturated calomel electrode. An aqueous solution of KBr was added, the silver potential was set at −66 mV, and the temperature was then elevated to 60° C. After adding 21 g of amber gelatin having an average molecular weight of 100,000, an aqueous solution of NaCl (5.1 g) was further added. An aqueous solution of $AgNO_3$ (206.3 g) and an aqueous solution KBr were added over 61 minutes by the double jet method while accelerating the flow. At this time, the silver potential was kept at −44 mV with respect to the saturated calomel electrode. After desalting, amber gelatin having an average molecular weight of 100,000 was added, and the mixture was adjusted at a pH of 5.8 and at a pAg of 8.8 at a temperature of 40° C., to prepare a seed emulsion. This seed emulsion was a tabular grain containing 1 mole of Ag and 80 g of gelatin per kg of the emulsion and having a mean circle-corresponding diameter of 1.46 μm, a deviation coefficient of circle-corresponding diameter of 28%, a mean thickness of 0.046 μm, and a mean aspect ratio of 32.

(Formation of Core)

An aqueous solution (1,200 mL) containing 134 g of the seed emulsion a, 1.9 g of KBr, and 22 g of amber gelatin having an average molecular weight of 100,000 was stirred while keeping at 75° C. An aqueous solution of $AgNO_3$ (43.9 g), an aqueous solution of KBr, and an aqueous solution of gelatin having a molecular weight of 20,000 were mixed just before addition within a separate chamber equipped with a magnetic coupling induction type stirrer as described in JP-A-10-43570 and added over 25 minutes. At this time, the silver potential was kept at −40 mV with respect to the saturated calomel electrode.

(Formation of First Shell)

After the formation of the core grains, an aqueous solution of $AgNO_3$ (43.9 g), an aqueous solution of KBr, and an aqueous solution of gelatin having a molecular weight of 20,000 were mixed just before addition within the foregoing separate chamber and added over 20 minutes. At this time, the silver potential was kept at −40 mV with respect to the saturated calomel electrode.

(Formation of Second Shell)

After the formation of the first shell, an aqueous solution of $AgNO_3$ (42.6 g), an aqueous solution of KBr, and an aqueous solution of gelatin having a molecular weight of 20,000 were mixed just before addition within the foregoing separate chamber and added over 17 minutes. At this time, the silver potential was kept at −20 mV with respect to the saturated calomel electrode. Thereafter, the temperature was decreased to 55° C.

(Formation of Third Shell)

After the formation of the second shell, the silver potential was adjusted at −55 mV. An aqueous solution of $AgNO_3$ (7.1 g), an aqueous solution of KI (6.9 g), and an aqueous solution of gelatin having a molecular weight of 20,000 were mixed just before addition within the foregoing separate chamber and added over 5 minutes.

(Formation of Fourth Shell)

After the formation of the third shell, an aqueous solution of $AgNO_3$ (66.4 g) and an aqueous solution KBr were added at constant flow rates by the double jet method over 30 minutes. On the way, iridium potassium hexachloride and yellow prussiate of potash were added. At this time, the silver potential was kept at 30 mV with respect to the saturated calomel electrode. After usual rinsing with water, gelatin was added, and the mixture was adjusted at a pH of 5.8 and a pAg of 8.8 at a temperature of 40° C. This emulsion was defined as an emulsion b. The emulsion b was a tabular grain having a mean circle-corresponding diameter of 3.3 μm, a deviation coefficient of circle-corresponding diameter of 21%, a mean thickness of 0.090 μm, and a mean aspect ratio of 37. Tabular grains having a circle-corresponding diameter of 3.3 m or more and a thickness of 0.090 μm or less accounted for 70% or more of the whole projected area. When the dye-occupied area was 80 square-angstrom, the monolayer saturated coverage was $1.45\times10^{-3}$ moles/mole-Ag.

The emulsion b was elevated to a temperature of 56° C., to which was then added $1.2\times10^{-3}$ moles/mole-Ag of the following comparative dye S-1. Thereafter, C-5, potassium thiocyanate, auric chloride, sodium thiosulfate, and N,N-dimethylselenourea were added thereto, thereby subjecting the mixture to optimum chemical sensitization. Additionally, $2.5\times10^{-4}$ moles/mole-Ag of S-1 was added to the resulting emulsion, which was then stirred for 60 minutes to prepare a comparative emulsion.

(2) Measurement of Light Absorption Intensity and Adsorption Amount:

The light absorption intensity per unit are was measured by thinly applying the resulting emulsion on a slide glass and measuring a transmission spectrum and a reflection spectrum using a microspectrophotometer, MSP65 manufactured by Karl Zeiss in the following methods, from which an absorption spectrum was determined. For the measurement of the transmission spectrum, a section where no grains are present was made a reference, and for the measurement of the reflection spectrum, silicon carbide having a known reflectance was measured and made a reference. The measurement section was a circular aperture section having a diameter of 1 μm, and the transmission spectrum and reflection spectrum were measured in a region of wave number of from 14,000 $cm^{-1}$ (714 nm) to 28,000 $cm^{-1}$ (357 nm) while adjusting the position such that the aperture section did not overlap an outline of the grain. Thus, the absorption spectrum was determined from an absorbance A [1−T (transmittance)−R (reflectance)]. A value obtained by subtracting the absorption of silver halide from the absorbance A was defined as an absorbance A'. Then, a value obtained by integrating −Log (1−A') by the wave number ($cm^{-1}$) was made ½. The resulting value was defined as the light absorption intensity per unit surface area. The integrating range is from 14,000 $cm^{-1}$ to 28,000 $cm^{-1}$. At this time, a tungsten lamp was used as a light source, and a light source voltage was 8 V. In order to make the damage of the dye by light irradiation minimum, an upstream monochromator was used, and a wavelength distance and a slit width were set at 2 nm and 2.5 nm, respectively. With respect to 200 grains, the absorption spectrum and light absorption intensity were determined.

The dye absorption amount was measured by the following manner. That is, the resulting liquid emulsion was centrifugally sedimented at 10,000 rpm for 10 minutes, and after freeze drying the precipitate, 0.05 g of the precipitate was added to 25 ml of a 25% sodium thiosulfate aqueous solution and methanol to make 50 mL. The solution was analyzed by high-performance liquid chromatography to determine the the the dye density. The number of adsorption layers was determined from the thus determined dye adsorption amount and monolayer saturated coverage.

(3) Preparation of Coating Sample:

On a subbing layer-provided triacetyl cellulose film support were applied an emulsion layer and a protective layer as shown in Table 1. Further, Samples 101 to 114 were prepared by changing the comparative compound S-1 by an equimolar amount of each of the compounds of the invention.

TABLE 1

Coating conditions of emulsion (1) Emulsion layer:

| | |
|---|---|
| Emulsion | Emulsion b (the dye as used is shown in Table 2) |
| Coupler | ($1.5 \times 10^{-3}$ moles/m$^2$) |

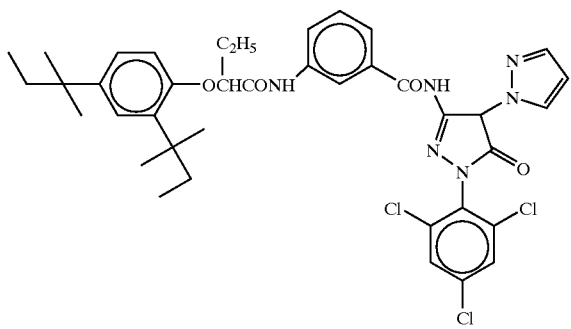

| | |
|---|---|
| Tricresyl phosphate | (2.0 g/m$^2$) |
| Gelatin | (2.30 g/m$^2$) |

(2) Protective:

| | |
|---|---|
| 2,4-Dichloro-6-hydroxy-s-triazine sodium salt | (0.08 g/m$^2$) |
| Gelatin | (1.80 g/m$^2$) |

These samples were each exposed for sensitometry (1/100 second) and subjected to the following color development processing.

Processing method:

| Step | Process time | Processing temperature | Replenishing amount | Tank volume |
|---|---|---|---|---|
| Color development | 2 minutes 45 seconds | 38° C. | 33 mL | 20 L |
| Bleaching | 6 minutes 30 seconds | 38° C. | 25 mL | 40 L |
| Water rinsing | 2 minutes 10 seconds | 24° C. | 1200 mL | 20 L |
| Fixing | 4 minutes 20 seconds | 38° C. | 25 mL | 30 L |
| Water rinsing 1 | 1 minute 05 seconds | 24° C. | Counter-conduit system from (2) to (1) | 10 L |
| Water rinsing 2 | 1 minute 00 second | 24° C. | 1200 mL | 10 L |
| Stabilizing | 1 minutes 05 seconds | 38° C. | 25 mL | 10 L |
| Drying | 4 minutes 20 seconds | 55° C. | | |

Replenishing amount: per 35 mm in width and 1 m in length

Next, the composition of each of the processing solutions will be described.

| | Mother liquor (g) | Replenisher (g) |
|---|---|---|
| (Color developing solution) | | |
| Diethylenetriamine pentaacetate | 1.0 | 1.1 |
| 1-Hydroxyethylidene-1,1-diphosphonic acid | 3.0 | 3.2 |
| Sodium sulfite | 4.0 | 4.4 |
| Potassium carbonate | 30.0 | 37.0 |
| Potassium bromide | 1.4 | 0.7 |
| Potassium iodide | 1.5 mg | — |
| Hydroxyalmine sulfate | 2.4 | 2.8 |
| 4-[N-ethyl-N-β-hydroxyethylamino]-2-methylaniline sulfate | 4.5 | 5.5 |
| Water to make | 1.0 L | 1.0 L |
| pH | 10.05 | 10.05 |
| (Bleaching solution) | | |
| Ferric ethylenediaminetetraacetate trihydrate | 100.0 | 120.0 |
| Disodium ethylenediaminetetraacetate | 10.0 | 11.0 |
| Ammonium bromide | 140.0 | 160.0 |
| Ammonium nitrate | 30.0 | 35.0 |
| Ammonia water (27%) | 6.5 mL | 4.0 mL |
| Water to make | 1.0 L | 1.0 L |
| pH | 6.0 | 5.7 |
| (Fixing solution) | | |
| Sodium ethylenediaminetetraacetate | 0.5 | 0.7 |
| Sodium sulfite | 7.0 | 8.0 |
| Sodium hydrogensulfite | 5.0 | 5.5 |
| Aqueous ammonium thiosulfate (70%) | 170.0 mL | 200.0 mL |
| Water to make | 1.0 L | 1.0 L |
| pH | 6.7 | 6.65 |
| (Stabilizing solution) | | |
| Formalin | 2.0 mL | 3.0 mL |
| Polyoxyethylene-p-mononylphenyl ether (average degree of polymerization: 10) | 0.3 | 0.45 |
| Disodium ethylenediaminetetraacetate | 0.05 | 0.08 |
| Water to make | 1.0 L | 1.0 L |
| pH | 5.8 to 8.0 | 5.8 to 8.0 |

The processed sample was measured for density by using a green filter and evaluated for sensitivity and fogging.

The sensitivity was defined as an inverse of the exposure amount giving a density of 0.2 higher than the fogging density, and the sensitive of each of the samples was expressed as a relative value when the value of Sample 101 was 100. The results of the light absorption intensity and sensitivity of each of the comparative sample and the samples of the invention are shown in Table 2. Incidentally, the light absorption intensity is a mean value with respect to 200 grains by the microspectrophotometry. In both of the light absorption intensity and the sensitivity, the values of Comparative Sample 101 were standards. Incidentally, the light absorption intensity of Comparative Sample 101 was 75.

TABLE 2

| Sample | Compound | Light absorption intensity | Sensitivity | Remarks |
|---|---|---|---|---|
| 101 | S-1 | 1 (standard) | 100 (standard) | Comparison |
| 102 | D-3 | 1.84 | 174 | Invention |
| 103 | D-4 | 1.80 | 170 | Invention |
| 104 | D-5 | 1.88 | 176 | Invention |
| 105 | D-6 | 1.83 | 171 | Invention |
| 106 | D-9 | 1.83 | 173 | Invention |
| 107 | D-10 | 1.90 | 182 | Invention |
| 108 | D-11 | 1.84 | 178 | Invention |
| 109 | D-15 | 1.82 | 172 | Invention |

TABLE 2-continued

| Sample | Compound | Light absorption intensity | Sensitivity | Remarks |
|---|---|---|---|---|
| 110 | D-16 | 1.79 | 170 | Invention |
| 111 | D-17 | 1.80 | 171 | Invention |
| 112 | D-18 | 1.86 | 176 | Invention |
| 113 | D-19 | 1.86 | 176 | Invention |
| 114 | D-20 | 1.84 | 175 | Invention |

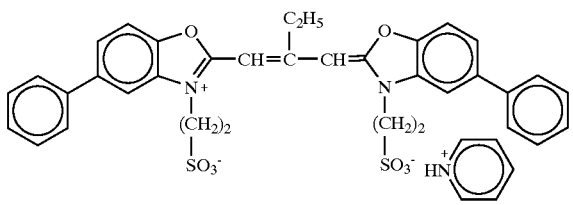

S-1

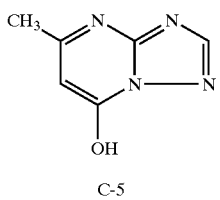

C-5

It is evident from Table 2 that since as compared with the comparative compound S-1, the compounds of the invention take a double-layer structure, they enhance the light absorbance, resulting in an increase of the sensitivity.

Further, since Sample 107 using the compound D-10 of the invention takes a substantially double-layer structure having the number of adsorption layers of 1.95.

It can be understood from the foregoing results that when the dye of the second layer is light excited, it contributes to achievement of a high sensitivity via energy transfer or electron transfer to the dye of the first layer.

Example 3

The same comparison as in Example 2 was carried out in a color negative photographic material system of Example 5 of JP-A-8-29904. As a result, when the sensitivity of a green-sensitive layer of a photographic material using the comparative compound S-1 was 100 (standard), a photographic material using the compound D-10 of the invention had a high sensitivity as 173. Further, the same comparison was carried out in an instant photographic material system of Example 1 of JP-A-2000-284442 (Japanese Patent Application No. 11-89801). As a result, when the sensitivity of a green-sensitive layer of a photographic material using the comparative compound S-1 was 100 (standard), a photographic material using the compound D-10 of the invention had a high sensitivity as 173. Moreover, the same comparison was carried out in each of a color reversal photographic material system of Example 1 of JP-A-7-92601 and JP-A-11-160828, a color paper system of Example 1 of JP-A-6-347944, an X-ray photographic material system of Example 1 of JP-A-8-122954, a heat-developable photographic material system of Example 1 of JP-A-2001-281785 (Japanese Patent Application No. 2000-89436), and a printing photographic material system of Example 1 of JP-A-8-292512. As a result, it was noted that the photographic materials using the compound of the invention had a high sensitivity as compared with those using the comparative compound. In addition, it was understood that in any of the foregoing systems, the photographic materials using the compound of the invention had a large light absorption intensity and a large number of adsorption layers of the chromophore and were useful.

When the methine dye-linked compound of the invention is used, a multilayer structure is formed, whereby a silver halide photographic material having an enhanced light absorbance and a high sensitivity can be obtained.

This application is based on Japanese Patent application JP 2002-81018, filed Mar. 22, 2002, the entire content of which is hereby incorporated by reference, the same as if set forth at length.

What is claimed is:

1. A silver halide photographic material comprising a support and at least one photosensitive silver halide emulsion layer, wherein the emulsion layer comprises a compound represented by the following formula (1):

$$\text{Dye1-(L}_1\text{-(Dye2)}_{m1})_{m2}\cdot\text{CIy} \tag{1}$$

wherein Dye1 represents a first chromophore; Dye2 represents a xanthene dye; $L_1$ represents a linking group; m1 represents an integer of from 1 to 5; m2 represents an integer of from 1 to 5; CI represents an ion for neutralizing a charge; and y represents a number necessary for neutralizing the charge.

2. The silver halide photographic material according to claim 1, wherein the xanthene dye is represented by the following formula (2):

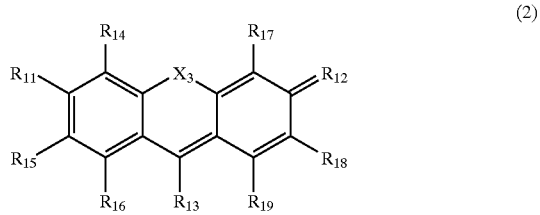

(2)

wherein $X_3$ represents an oxygen atom or a sulfur atom; $R_{11}$ represents one of —OM, —SM, and —NR$_{20}$R$_{21}$; $R_{12}$ represents one of =O, =S, and =$^+$NR$_{22}$R$_{23}$; M represents a proton or a cation; $R_{20}$ to $R_{23}$ each independently represents a hydrogen atom, an alkyl group, an alkenyl group, an aryl group, or a heterocyclic group; $R_{20}$ and $R_{21}$, or $R_{22}$ and $R_{23}$ may be linked to each other to form a ring; $R_{13}$ to $R_{19}$ each independently represents a hydrogen atom or a substituent; and in $R_{11}$ to $R_{19}$, the adjacent substituents may be linked to each other to form a ring.

3. The silver halide photographic material according to claim 2, wherein $X_3$ represents an oxygen atom.

4. The silver halide photographic material according to claim 2, wherein $R_{13}$ represents an unsubstituted or substituted aryl group.

5. The silver halide photographic material according to claim 2, wherein $R_{11}$ represents one of —OM and —NR$_{20}$R$_{21}$; and $R_{12}$ represents =O or =$^+$NR$_{22}$R$_{23}$.

6. The silver halide photographic material according to claim 1, wherein Dye1 represents one of a cyanine chromophore, a merocyanine chromophore, and an oxonol chromophore.

7. The silver halide photographic material according to claim 1, wherein $L_1$ represents -G$_1$-(A$_1$-G$_2$)$_{r1}$—, wherein G$_1$ and G$_2$ each independently represents an alkylene group, an alkenylene group, or an arylene group; A$_1$ represents one of —O—, —S—, —SO$_2$—, —NR$_3$—, —COO—, —CONR$_4$—, and —SO$_2$NR$_5$—, regardless of the left or right direction; R$_3$ to R$_5$ each independently represents a hydrogen atom, an alkyl group, an alkenyl group, an aryl group, or a heterocyclic group; and t1 represents an integer of from 1 to 10.

8. The silver halide photographic material according to claim 1, wherein the compound represented by the formula (1) is represented by the following formula (3):

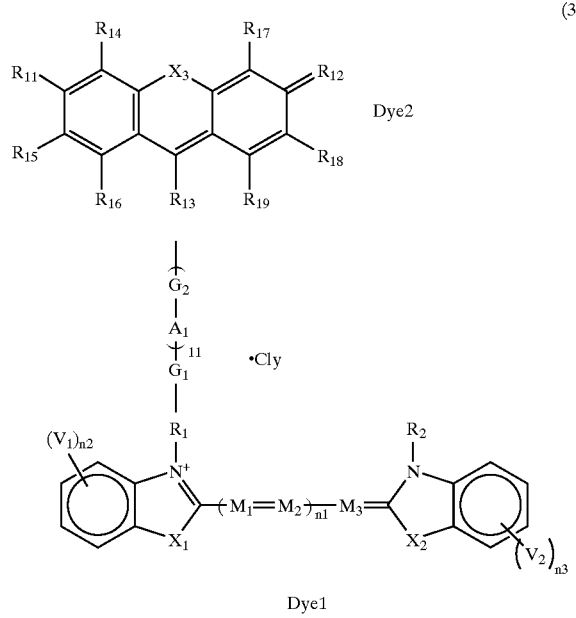

(3)

wherein X$_3$ represents an oxygen atom or a sulfur atom; R$_{11}$ represents one of —OM, —SM, and —NR$_{20}$OR$_{21}$; R$_{12}$ represents one of =O, =S, and =$^+$NR$_{22}$R$_{23}$; M represents a proton or a cation; R$_{20}$ to R$_{23}$ each independently represents a hydrogen atom, an alkyl group, an alkenyl group, an aryl group, or a heterocyclic group; R$_{20}$ and R$_{21}$, or R$_{22}$ and R$_{23}$ may be linked to each other to form a ring; R$_{13}$ to R$_{19}$ each independently represents a hydrogen atom or a substituent; in R$_{11}$ to R$_{19}$, the adjacent substituents may be linked to each other to form a ring; G$_1$ and G$_2$ each independently represents an alkylene group, an alkenylene group, or an arylene group; A$_1$ represents one of —O—, —S—, —SO$_2$—, —NR$_3$—, —COO—, —CONR$_4$—, and —SO$_2$NR$_5$—, regardless of the left or right direction; R$_3$ to R$_5$ each independently represents a hydrogen atom, an alkyl group, an alkenyl group, an aryl group, or a heterocyclic group; t1 represents an integer of from 1 to 10; X$_1$ and X$_2$ each independently represents —O—, —S—, —NR$_6$—, or —CR$_7$R$_8$—; R$_6$ to R$_8$ each independently represents a hydrogen atom, an alkyl group, an alkenyl group, an aryl group, or a heterocyclic group; R$_1$ and R$_2$ each independently represents a hydrogen atom, an alkyl group, an alkenyl group, an aryl group, or a heterocyclic group; M$_1$ to M$_3$ each independently represents a methine group; n$_1$ represents an integer of from 0 to 3; V$_1$ and V$_2$ each represents a substituent; n$_2$ and n$_3$ each represents an integer of from 0 to 4; when each of n$_2$ and n$_3$ is 2 or more, V$_1$s' and V$_2$s' may be respectively the same or different, or may be linked to each other to form a ring; CI represents an ion for neutralizing a charge; and y represents a number necessary for neutralizing the charge, provided that G$_1$ is linked to Dye1 at R$_1$ or V$_1$, and G$_2$ is linked to Dye2 at one of R$_{11}$ to R$_{19}$.

9. The silver halide photographic material according to claim 7, wherein G$_1$ and G$_2$ each represents an alkylene group.

10. The silver halide photographic material according to claim 7, wherein A$_1$ represents —O—, —SO$_2$—, —COO—, or —CONR$_4$—.

11. The silver halide photographic material according to claim 8, wherein X$_1$ and X$_2$ each represents —O— or —S—.

12. The silver halide photographic material according to claim 8, wherein G$_1$ is linked to R$_1$.

13. The silver halide photographic material according to claim 8, wherein G$_2$ is linked to R$_{13}$.

14. The silver halide photographic material according to claim 1, wherein an adsorptivity of Dye1 to silver halide grains is larger than that of Dye2.

15. The silver halide photographic material according to claim 1, wherein in a silver halide photographic emulsion, the compound represented by the formula (1) is adsorbed on silver halide grains by Dye1, and Dye2 not adsorbed on silver halide grains causes electron trnasfer or energy transfer to Dye1 upon light excitation.

16. The silver halide photographic material according to claim 1, wherein in a silver halide photographic emulsion, the compound represented by the formula (1) is adsorbed on silver halide grains by Dye1 to form J association.

17. The silver halide photographic material according to claim 1, wherein in a silver halide photographic emulsion, when the compound represented by the formula (1) is adsorbed on silver halide grains by Dye1, Dye2 keeps a monomer state in an adsorbing spectral manner.

18. The silver halide photographic material according to claim 1, wherein the silver halide photographic emulsion comprising the compound represented by the formula (1) is an emulsion in which tabular grains having an aspect ratio of 2 or more account for 50% (area) or more of a whole of silver halide grains.

19. The silver halide photographic material according to claim 1, wherein the silver halide photographic emulsion comprising the compound represented by the formula (1) is subjected to selenium sensitization.

* * * * *